United States Patent
Patel

(10) Patent No.: US 12,120,429 B2
(45) Date of Patent: Oct. 15, 2024

(54) METHOD AND SYSTEM FOR REAL-TIME GEO REFERENCING STABILIZATION

(71) Applicant: Palantir Technologies Inc., Denver, CO (US)

(72) Inventor: Jay Harshadbhai Patel, Milpitas, CA (US)

(73) Assignee: Palantir Technologies Inc., Denver, CO (US)

(*) Notice: Subject to any disclaimer, the term of this patent is extended or adjusted under 35 U.S.C. 154(b) by 113 days.

(21) Appl. No.: 17/889,650

(22) Filed: Aug. 17, 2022

(65) Prior Publication Data

US 2024/0098367 A1   Mar. 21, 2024

Related U.S. Application Data

(60) Provisional application No. 63/332,395, filed on Apr. 19, 2022.

(51) Int. Cl.
*H04N 23/68* (2023.01)
*B64C 39/02* (2023.01)
(Continued)

(52) U.S. Cl.
CPC ......... *H04N 23/683* (2023.01); *B64C 39/024* (2013.01); *G06F 18/24147* (2023.01);
(Continued)

(58) Field of Classification Search
CPC .............. H04N 23/683; B64C 39/024; G06F 18/24147; G06T 7/35; G06T 7/38;
(Continued)

(56) References Cited

U.S. PATENT DOCUMENTS

2009/0324131 A1* 12/2009 Tong ................ G06T 7/75
345/503
2011/0280453 A1* 11/2011 Chen ................ G01C 21/3807
382/113
(Continued)

FOREIGN PATENT DOCUMENTS

CN   109325913   *   2/2019
CN   109325913 A       2/2019
(Continued)

OTHER PUBLICATIONS

Extended European Search Report dated Oct. 12, 2023, issued in related European Patent Application No. 23167894.7 (15 pages).

*Primary Examiner* — Lin Ye
*Assistant Examiner* — Chan T Nguyen
(74) *Attorney, Agent, or Firm* — Sheppard Mullin Richter & Hampton LLP

(57) ABSTRACT

A computing system and methods are provided for georeferencing stabilization. An exemplary method includes: obtaining a video stream capturing an area from a camera of a drone, where the video stream includes a plurality of frames, each including a field of view of the image capturing device and metadata of the image capturing device when the frame is captured; constructing a geographic (geo) lattice for the field of view in each of the plurality of frames, the geo lattice comprises a plurality of points, each being associated with raw coordinates determined based on the corresponding metadata; and building a lattice map with stabilized geo coordinates by (1) aligning the frames, (2) averaging the raw geo coordinates for given intersection points, and (3) building the lattice map based on the averaged geo coordinates of the intersection points.

18 Claims, 24 Drawing Sheets

(51) Int. Cl.
*B64U 101/30* (2023.01)
*G06F 18/2413* (2023.01)
*G06T 7/35* (2017.01)
*G06T 7/38* (2017.01)
*G06T 15/06* (2011.01)
*G06V 20/17* (2022.01)
*G06V 20/40* (2022.01)

(52) U.S. Cl.
CPC .................. *G06T 7/35* (2017.01); *G06T 7/38* (2017.01); *G06T 15/06* (2013.01); *G06V 20/17* (2022.01); *G06V 20/46* (2022.01); *B64U 2101/30* (2023.01); *G06T 2207/10016* (2013.01); *G06T 2207/10032* (2013.01); *G06V 2201/10* (2022.01)

(58) Field of Classification Search
CPC ........... G06T 15/06; G06T 2207/10016; G06T 2207/10032; G06V 20/17; G06V 20/46; G06V 2201/10; B64U 2101/30

USPC ...................................................... 348/208.6
See application file for complete search history.

(56) References Cited

U.S. PATENT DOCUMENTS

| | | | |
|---|---|---|---|
| 2014/0064554 A1* | 3/2014 | Coulter | G06T 7/254 |
| | | | 382/294 |
| 2019/0304168 A1* | 10/2019 | Korb | G06F 18/22 |
| 2020/0226352 A1* | 7/2020 | Coulter | G06T 7/60 |
| 2022/0215507 A1* | 7/2022 | Ye | G06T 3/14 |
| 2023/0306739 A1* | 9/2023 | Yu | G06V 20/46 |
| 2023/0419660 A1* | 12/2023 | Uljanovs | G06V 20/194 |
| 2024/0005548 A1* | 1/2024 | Kai | G06T 7/70 |

FOREIGN PATENT DOCUMENTS

EP  3842735 A1  6/2021
KR  2020-0120402 A  10/2020

* cited by examiner

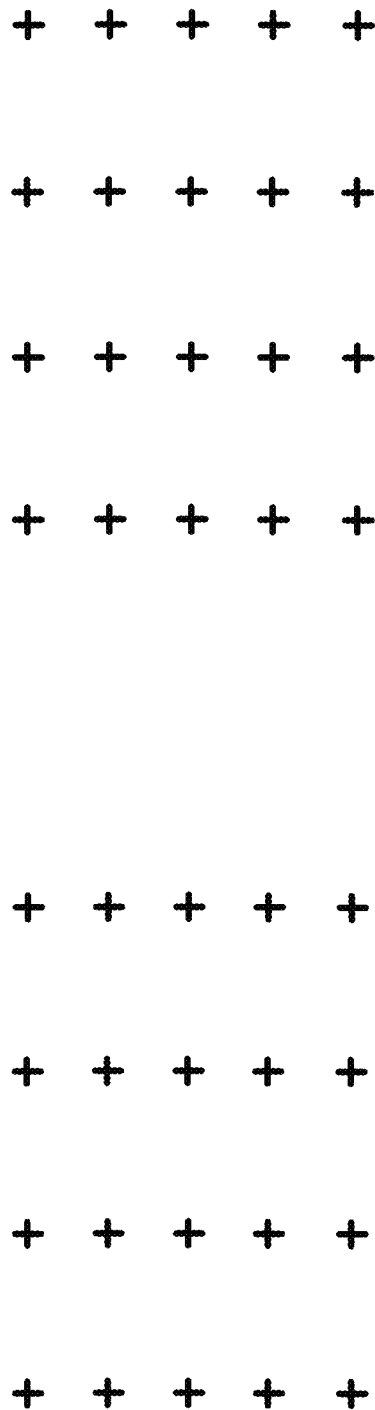
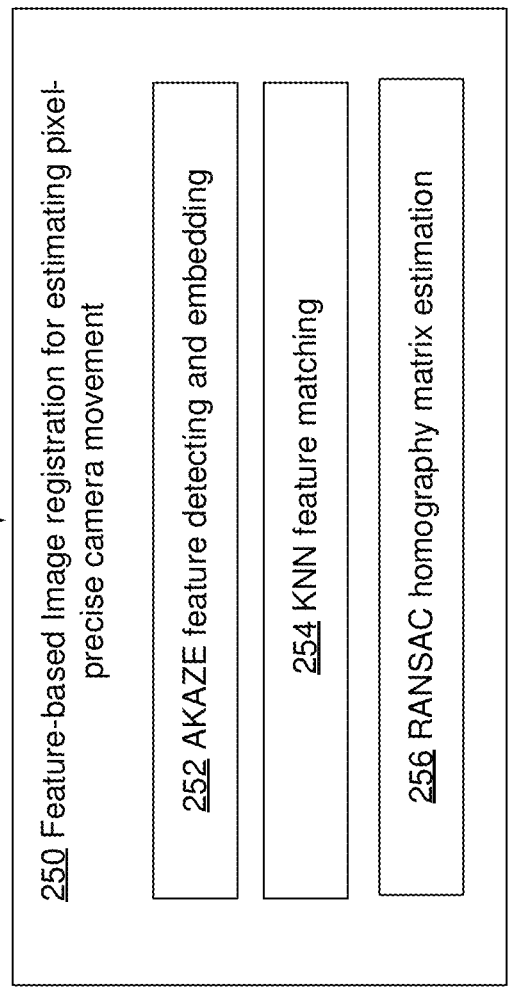
FIGURE 2B

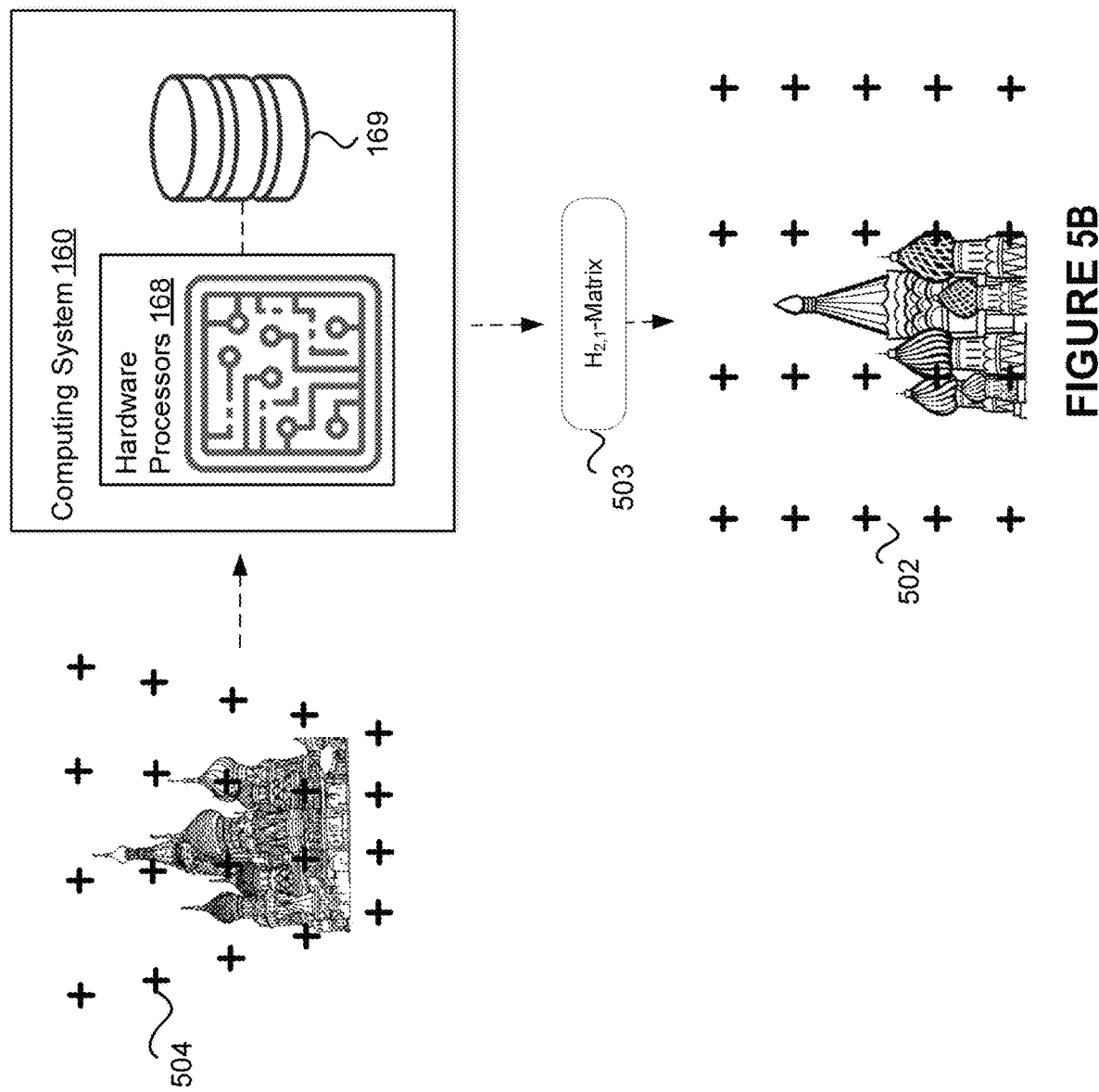

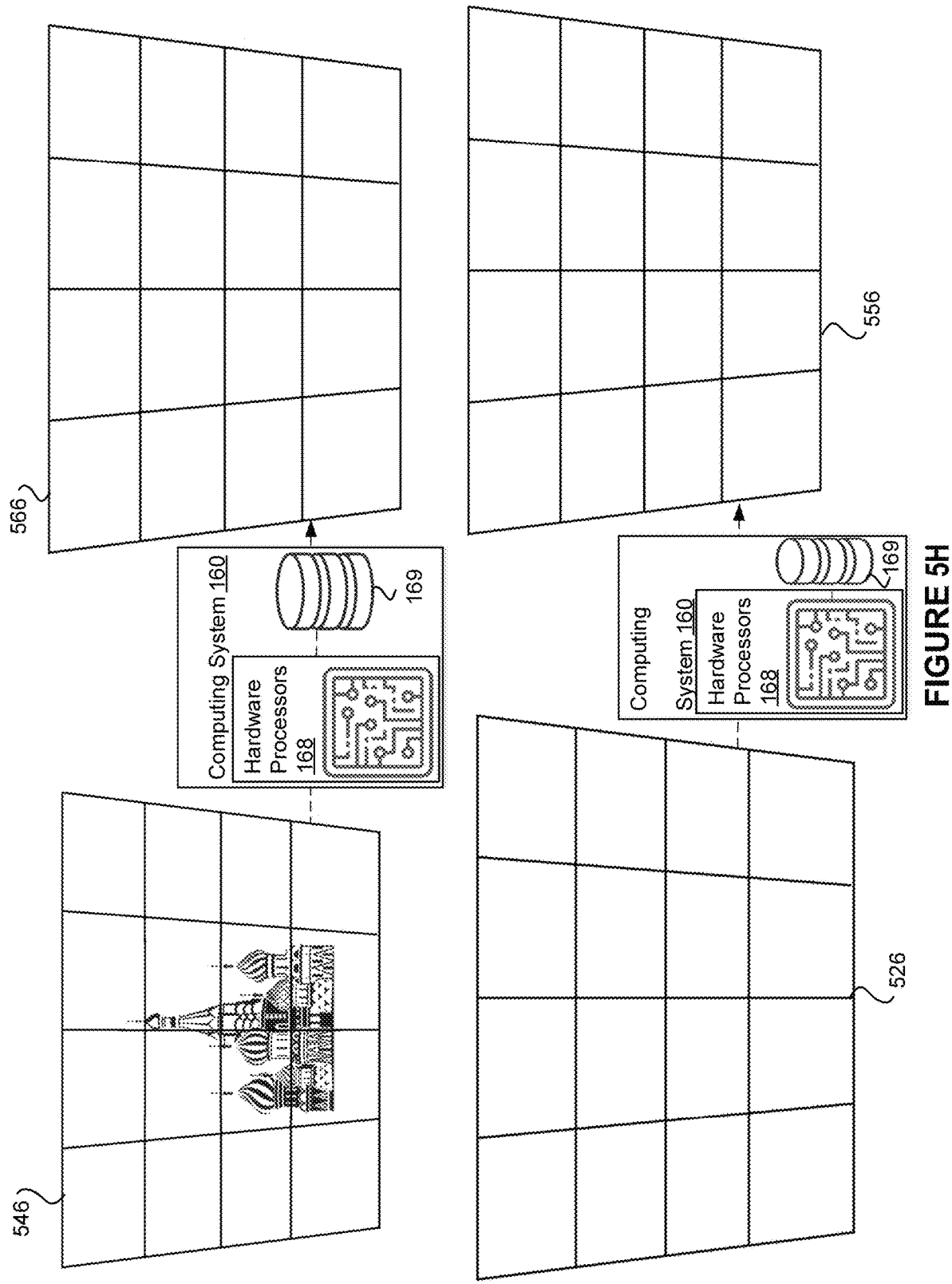

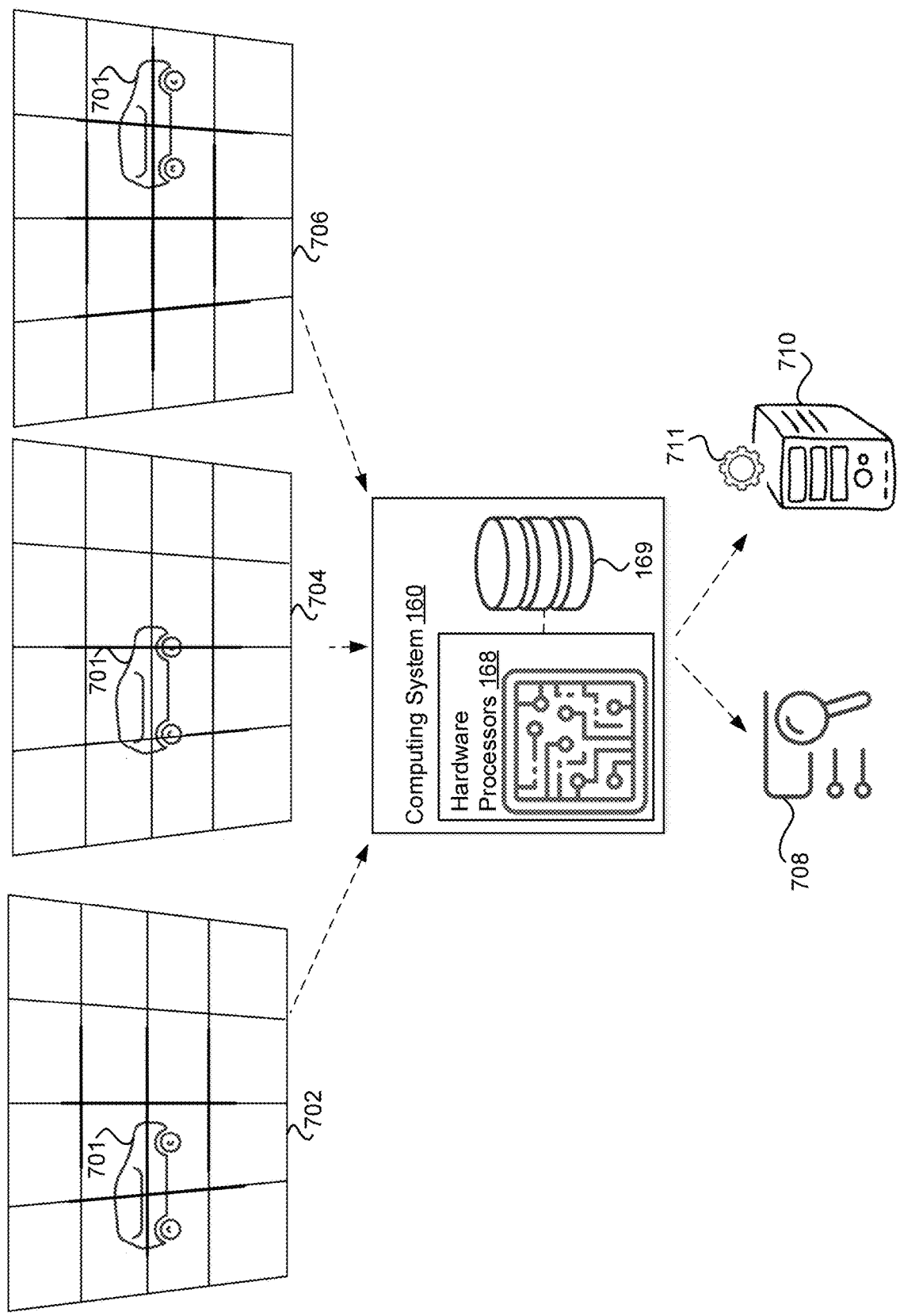

METHOD AND SYSTEM FOR REAL-TIME GEO REFERENCING STABILIZATION

CROSS-REFERENCE TO RELATED APPLICATION

This application claims the benefit under 35 U.S.C. 119(e) of U.S. Provisional Application No. 63/332,395, filed Apr. 19, 2022, the content of which is hereby incorporated in its entirety.

FIELD OF THE INVENTION

This disclosure relates to approaches of stabilizing georeferencing for videos, in particular, to smoothing the jitters in georeferencing for full motion videos (FMV).

BACKGROUND

In recent years, unmanned aerial vehicles (UAVs) such as drones or multirotor helicopters are increasingly used as remote sensing platforms, primarily due to improvements in the availability of accurate and miniature global positioning systems (GPS) and inertial measurement units (IMUs), along with the availability of high-quality digital cameras. Typical applications of UAVs includes generating full motion videos (FMVs) of a geolocation. FMV requires synchronization between videos captured by the UAV and ground-truth maps, which involves mapping the internal coordinate system in the UAV video to the geographic coordinate system. This process is commonly known as georeferencing.

One challenge of georeferencing using UAV images (e.g., videos or photos) is that UAVs usually map an area at an ultrahigh resolution or at an ultrahigh-zoom level. Therefore, even small errors in the UAVs' sensor model may be propagated and magnified in determining the internal coordinate system. This may lead to significant errors in the resultant FMVs and high frame-to-frame jittering of the geo projection. To address this challenge, this disclosure describes a novel solution for stabilizing georeferencing in UAV images in real-time. The described solution is edge-computing friendly and without relying on ground-truth maps.

SUMMARY

Various embodiments of the present disclosure can include computing systems, methods, and non-transitory computer readable media configured to stabilize georeferencing in UAV images in real-time.

According to a first aspect of the disclosure, a computer-implemented method for georeferencing stabilization is described. The method may include obtaining a video stream capturing an area from a camera of a drone, where the video stream includes a plurality of frames, each including a field of view of the image capturing device and metadata of the image capturing device when the frame is captured; constructing a geographic (geo) lattice for the field of view in each of the plurality of frames, the geo lattice comprises a plurality of points, each being associated with raw coordinates determined based on the corresponding metadata; and building a lattice map with stabilized geo coordinates by (1) aligning the frames, (2) averaging the raw geo coordinates for given intersection points, and (3) building the lattice map based on the averaged geo coordinates of the intersection points. The lattice map may be built by: performing image registration based on the plurality of frames to obtain a plurality of aligned geo lattices; for each point in the lattice map, obtaining multiple pairs of raw coordinates corresponding to the point from the plurality of aligned geo lattices; computing a pair of stabilized geographic coordinates for the point by averaging the multiple pairs of raw coordinates; and building the lattice map for the area by associating the point with the pair of stabilized geographic coordinates.

According to a second aspect of the disclosure, a computing system for georeferencing stabilization is described. The computing system may include one or more processors; and memory storing instructions that, when executed by the one or more processors, cause the system to perform operations. The operations may include: obtaining a video stream capturing an area from a camera of a drone, where the video stream includes a plurality of frames, each including a field of view of the image capturing device and metadata of the image capturing device when the frame is captured; constructing a geographic (geo) lattice for the field of view in each of the plurality of frames, the geo lattice comprises a plurality of points, each point being associated with raw coordinates determined based on the corresponding metadata; and building a lattice map with stabilized geo coordinates by (1) aligning the frames, (2) averaging the raw geo coordinates for given intersection points, and (3) building the lattice map based on the averaged geo coordinates of the intersection points.

According to a third aspect of the disclosure, a non-transitory computer-readable storage medium for georeferencing stabilization is described. The storage medium may be configured with instructions executable by one or more processors to cause the one or more processors to perform operations. The operations may include obtaining a video stream capturing an area from a camera of a drone, where the video stream includes a plurality of frames, each including a field of view of the image capturing device and metadata of the image capturing device when the frame is captured; constructing a geographic (geo) lattice for the field of view in each of the plurality of frames, the geo lattice comprises a plurality of points, each being associated with raw coordinates determined based on the corresponding metadata; and building a lattice map with stabilized geo coordinates by (1) aligning the frames, (2) averaging the raw geo coordinates for given intersection points, and (3) building the lattice map based on the averaged geo coordinates of the intersection points.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2B illustrates an example system diagram for image alignment in georeferencing stabilization, in accordance with various embodiments.

FIGS. 5A-5I illustrate an example technical implementation for generating a smoothed, orthorectified lattice map, in accordance with various embodiments.

FIGS. 7-10 illustrates downstream actions to be performed following the orthorectification which generates a stabilized lattice map (e.g., following any steps or implementations performed in FIGS. 1A, 1B, 2A, 2B, 3, 4, 5A-5I, and/or 6A-6C). Any actions described with respect to any of the FIGURES may be applicable to the other FIGURES. For example, any action described in FIG. 7 may also be applicable to any of FIGS. 8-10.

Any relevant principles described with respect to a FIGURE may also be applicable to any other FIGURES.

DETAILED DESCRIPTION

Figure 1A:
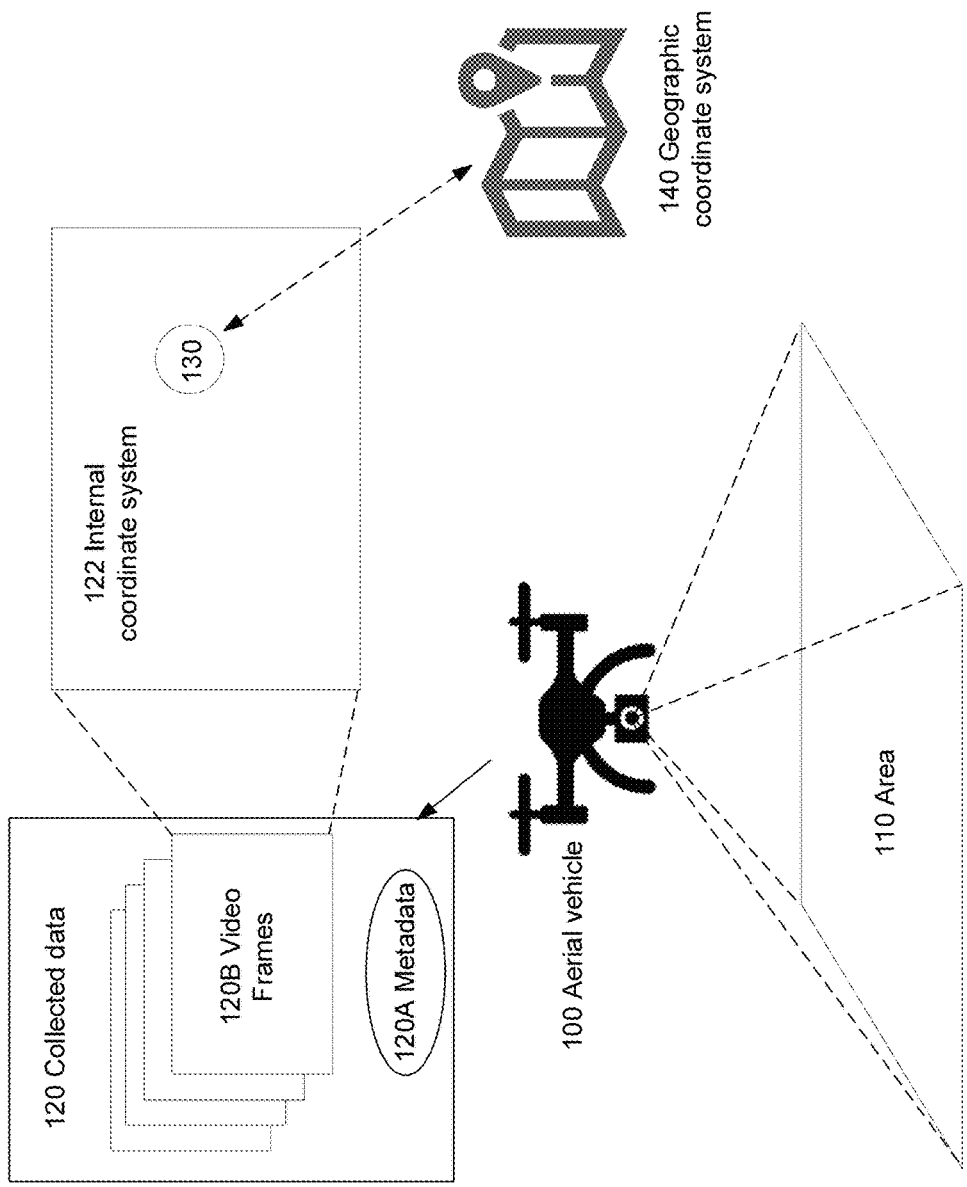
FIG. 1A illustrates an example environment for georeferencing of UAV-collected images, in accordance with various embodiments.

Using unmanned aerial vehicles (UAVs) to produce full motion videos (FMVs) requires georeferencing for each frame of the videos collected by the UAVs. FIG. 1A illustrates an example environment for georeferencing of UAV-collected images 120, in accordance with various embodiments. As shown in FIG. 1A, while capturing video frames 120B (e.g., as a part of a video stream), a UAV 100 may also collect metadata 120A, e.g., geo coordinates of the UAV, orientation (roll/pitch/yaw) of the UAV, orientation of camera/image sensor of the UAV, the field of view (FOV) of the camera/image sensor of the UAV, other suitable metadata, or any combination thereof. The parameters controlling the collection of the metadata may be incorporated into or utilized as a sensor model or sensor framework (hereinafter "sensor model"). More generally, the parameters may encompass interior sensor parameters and exterior platform parameters, and may be associated with modelling geometry, radiometry, time, and error, which may encompass geometric, terrain, and sensor errors, among other errors. The sensor model may include descriptions of the parameters and/or protocol or instructions regarding obtaining of a lattice, or geo-coordinates, for objects 130 in the video frames based on the metadata. In some examples, the sensor model may include protocol or instructions for adjusting or correcting for terrain effects (e.g., a deviation between a highest elevation point and a lowest elevation point within a captured region) and/or lens distortion. In other examples, if amounts of distortion attributed to terrain corrections and/or lens distortion are less than respective thresholds, the sensor model may disregard such amounts of distortion and refrain from adjusting or correcting. The internal geo coordinates may form an internal coordinate system 122. The sensor model may then map the internal coordinate system 122 to a geographic coordinate system 140 as close as practicable. However, due to the ultrahigh-zoom level of the camera of UAVs, even small errors in the sensor model may be propagated and magnified through the above-described computing and mapping processes of the sensor model. This may lead to high frame-to-frame jitters of the geo projection (e.g., the calculated and mapped internal coordinates may jitter across consecutive video frames). Some example errors in the sensor model may include inaccuracies of one or more sensors that detect roll/pitch/yaw, such as in camera or image sensors of the UAV. Other positional errors may be attributed to time synchronization delays, inaccuracy of the GPS measurements of the UAV, etc. These jitters or unsteadiness in the geo projection may result in feature and/or pixel displacement, sometimes on an order of hundreds of meters even on sub-meter resolution imagery, which may hinder any further processing of the FMVs, such as direct measurement, feature extraction, and other analyses or transformations. For instance, the ground-based objects detected and marked on the FMV may have unstable and jittering geo coordinates on a map created based on the FMV. Performing object tracking may be infeasible with such noisy input based on detections extracted from the FMV.

Conventional approaches for stabilized georeferencing of UAV-captured videos involve geo registration of the video frames with a ground-truth map (e.g., a 3-dimensiontal ground-truth map). For instance, after determining a rough direction of the camera of the UAV based on the sensor model, the 3D ground-truth map may be looked up to search for a similar projection of the area captured by the UAV. The frames of the UAV-collected video may be compared against and mapped to the 3D ground-truth map projection to determine accurate geo coordinates for the points in the video frames. However, these conventional approaches are resource-intensive and may not be applicable for edge computing environments. For example, the 3D ground-truth map may not always be available, and these conventional approaches will not work without pre-stored 3D ground-truth maps. As another example, the 3D ground-truth maps usually contain a large volume of data, which is usually stored in servers (e.g., centralized servers or cloud servers) and may not fit in the limited storage space on the edge devices such as UAVs. To perform the 3D ground-truth map lookup operations, the video frames may have to be compressed and transmitted to the servers for processing. During this process, both the data compression, transmission, and the 3D ground-truth map lookup operations are slow and computing-intensive. Therefore, these approaches are not practical to be implemented on edge devices.

To address the above challenges, this following description details a direct georeferencing of UAV images for edge devices. The approach bypasses the requirement of the 3D ground-truth maps and the expensive data transmission, and produces stabilized lattice maps with smooth geo coordinates. These principles will be elucidated in more detail in the subsequent FIGURES.

Figure 1B:
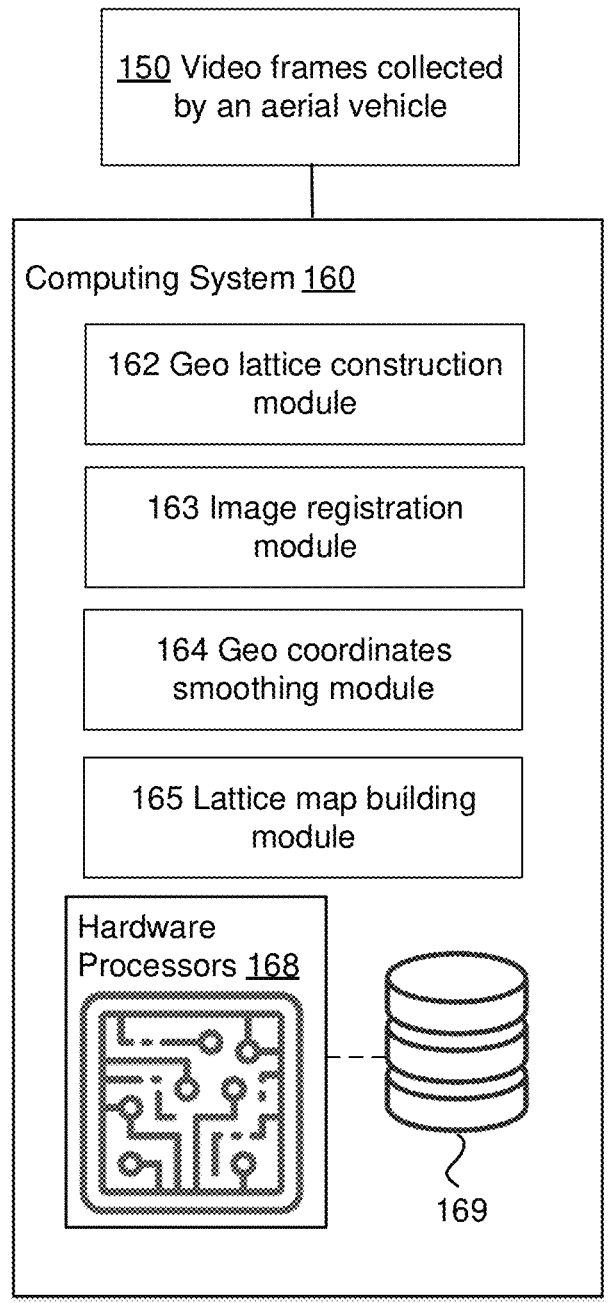
FIG. 1B illustrates an example system diagram of an aerial vehicle with hardware components for georeferencing stabilization, in accordance with various embodiments.

FIG. 1B illustrates an example system diagram of an aerial vehicle with hardware components for georeferencing stabilization, in accordance with various embodiments. The system diagram in FIG. 1B is for illustrative purposes, and a computing system 160 therein may include more, fewer, or alternative components depending on the implementation. The computing system 160 may be implemented in various forms, such as a field programmable gate array (FPGA)-implemented circuit, an application-specific integrated circuit (ASIC), or another suitable form. The computing system 160 may include a processing unit such as hardware processors 168 (e.g., CPUs, GPUs, NPUs, another suitable processing unit, or any combination thereof) and a storage unit, datastore, or storage 169 (e.g., a memory block). The hardware processors 168 may be configured to perform computations involved in georeferencing stabilization based on video frames 150 captured by the aerial vehicle, and the storage unit 169 may be configured to store data of a geo lattice map with stabilized geo coordinates generated from the georeferencing stabilization.

As shown in FIG. 1B, the video frames 150 collected by the aerial vehicle (e.g., a drone) may be fed or ingested as input, together with a geo lattice, to the computing system 160 to generate a geo lattice map which has been orthorectified with stabilized geo coordinates. As will be explained, the geo lattice map may facilitate, or be used as, storage of a currently accumulated average of previous frames. For example, for frame N, wherein N is a positive integer, a corresponding geo lattice map may represent, and/or store, an averaged lattice map from frames 1 through N−1. Upon incorporating frame N into the corresponding geo lattice map, a smoothed lattice map for frame N may be extracted. The video frames 150 may include jittery or inaccurate coordinates determined based on the sensor model of the aerial vehicle. In some embodiments, the computing system 160 may include a geo lattice construction module 162, an image registration module 163, a geo coordinates smoothing module 164, and a lattice map building module 165.

Figure 2A:
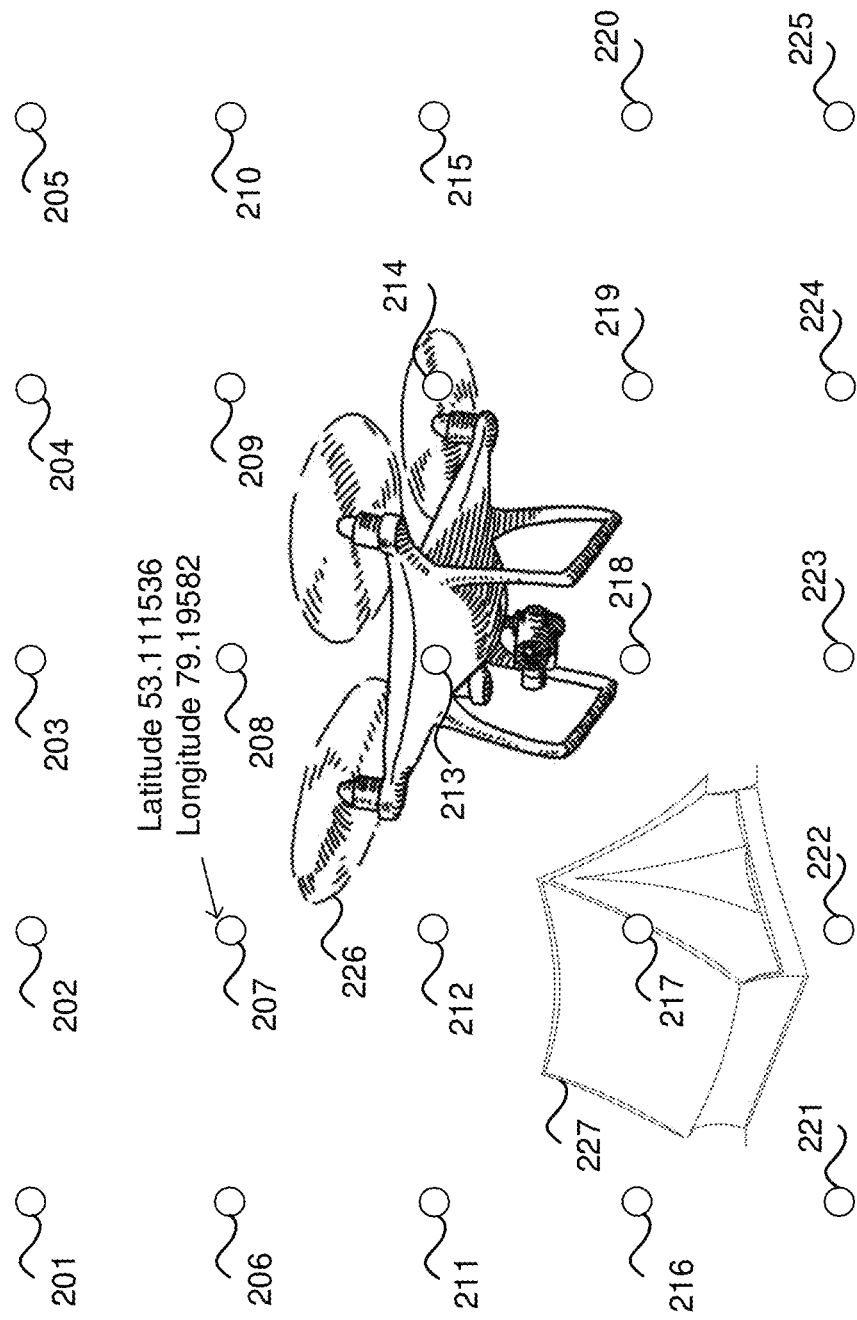
FIG. 2A illustrates an example geographic (geo) lattice on a UAV-collected video frame, in accordance with various embodiments.

In some embodiments, the geo lattice construction module 162 may be configured to construct geo lattices for the plurality of video frames 150. A geo lattice may encompass a raster, and/or include a plurality of points or pixels (hereinafter "points") 201-225, which may be evenly spaced from one another. The points 201-225 may be evenly An example geo lattice is shown in FIG. 2A, which illustrates a five-by-five geo lattice overlaid on a video frame, which may include features 226 and 227. Each of the points 201-225 may have a latitude and/or longitude value. point The aerial vehicle may be equipped with various sensors to collect sensor data and a sensor model for processing the collected sensor data. For instance, a drone may collect GPS signals, orientations of the drone and the camera on the drone, an altitude, etc. The geo coordinates for the points on the geo lattice may be computed using the sensor model on the drone. The geo coordinates may further be determined based on the GPS signals, orientations of the drone and the camera, the altitude, other suitable sensor data, or any combination thereof. With the geo coordinates of the points, any object on the video frame may be computed using interpolation of the geo coordinates of surrounding points. In some embodiments, the geo lattice may be constructed by ray tracing using a particular model of the earth for each video frame. Ray tracing refers to a technique for modeling light transport for generating digital images. In generating the geo lattice, ray tracing may be used along with an earth model to generate another layer (geo lattice layer) over the video frame. In some embodiments, Shuttle Radar Topography Mission (SRTM) may be applied to correct the computed geo coordinates of the points using optimization algorithms.

Figure 5A:
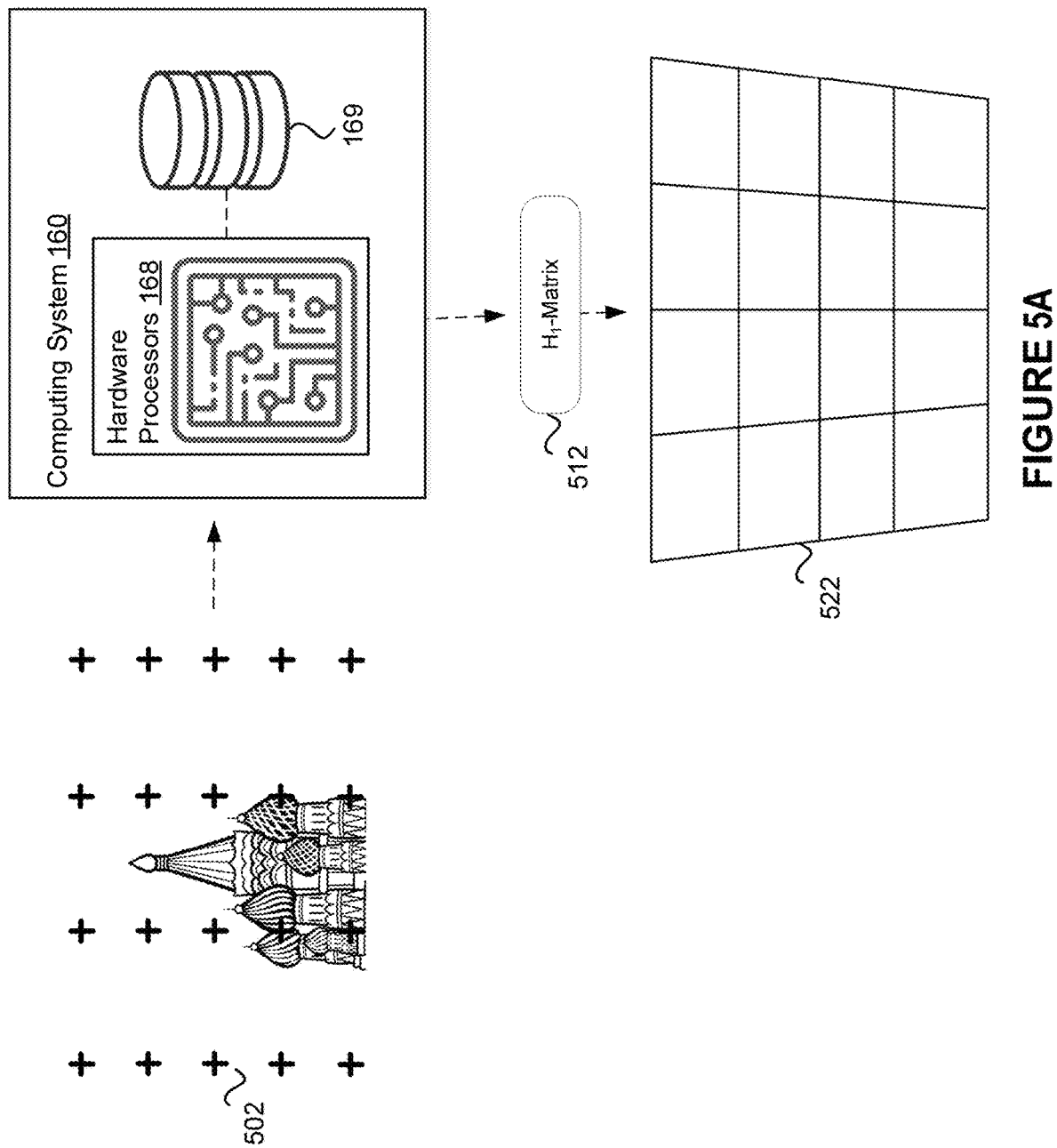

Referring back to FIG. 1B, in some embodiments, the image registration module 163 may be configured to perform image registration to match consecutive video frames to align the geo lattices constructed on the video frames. Image registration refers to a task of finding the correspondences across two or more video frames and bringing them into a single coordinate system. In some examples, the image registration may fuse sensor data from different types of sensors, such as synthetic aperture radar (SAR) and camera data. Image registration may entail estimating a geometric transformation to bring homologous points from two video or two image frames to a same point, or as close as possible. Image registration may encompass rotation, scaling, and/or translation. Image registration may be feature-based, learning-based, or optimization-based. FIG. 2B illustrates a system diagram for image alignment in georeferencing stabilization, in accordance with various embodiments. As shown in FIG. 2B, two consecutive video frames 240 may go through a feature-based image registration process 250 to estimate pixel-precise camera movement. For instance, the feature-based image registration process 250 may include feature extracting and embedding step 252 using various techniques, such as accelerated-KAZE (AKAZE) feature detection and descriptor algorithm. The extracted features may refer to representative points/areas of interest in the video frames. These representative features may be transformed into a collection of feature vectors that are invariant to translation, rotation, scaling, and to some extent illumination changes. These feature vectors may also be referred to as feature descriptors. Subsequently, a feature descriptor matching process 254 may be executed to identify key feature points representing the same point in both video frames 240 based on the feature descriptors. Example algorithms may include K-nearest neighbors (KNN) feature matching. When using KNN, the k-closest matches for each feature descriptor are computed based on a distance metric and using a cut-off criteria. Based on the matched key feature points, a homography estimation process 256 may be executed to obtain a geometric transformation and/or a homography matrix between every two sets of video frames that estimates camera movement between consecutive video frames. Example algorithms include random sample consensus (RANSAC). For instance, RANSAC may sample randomly from the key feature points and compute a homography matrix. Depending on how well the homography matrix matches the rest of the key feature points, outliers and inliers are computed for each such randomly sampled set. The homography matrix associated with the smallest number of outliers may be selected as the transformation matrix between the two video frames. The "outliers" may be referred to as the mapping errors for using the corresponding homography matrix between the two video frames. In some embodiments, the error rate may have to meet a threshold. If the error rate is above the threshold, one of the video frames may be skipped, discarded, or disregarded from the homography estimation process 256. For instance, when a drone is affected by a sudden force or movement, the video frame collected during this period may suffer significant mapping errors from other video frames and thus may be skipped, discarded, or disregarded in building the stabilized lattice. FIGS. 5A and 5B illustrate two detailed implementations of computing homography matrices with performance improvement.

Referring back to FIG. 1B again, the computed homography matrices may be used to align the geo lattices of the video frames. The aligned geo lattices may have aligned points. In some embodiments, the geo coordinate smoothing module 164 may be configured to smooth the geo coordinates of the points (e.g., 201-225, and analogous or corresponding points or positions of other frames) of the aligned geo lattices. For example, a point that appears in multiple video frames may have different geo coordinates in the corresponding video frames (e.g., caused by jittering errors in the sensor model). The geo coordinate smoothing module 164 may compute a pair of stabilized geo coordinates for the point by averaging the multiple pairs of geo coordinates from different frames. Thus, the geo coordinate smoothing module 164 may obtain, generate, or produce a smooth, stabilized five-by-five geo lattice with stabilized geo coordinates. This smooth, stabilized five-by-five geo lattice may be augmented by metadata of each frame to facilitate obtaining coordinates of the points. In some examples, a machine learning model, algorithm, or component may be used to obtain these coordinates. The lattice map building module 165 may generate and/or construct a stabilized lattice map by overlaying a frame via orthorectification with respect to the geo lattice. In some examples, a stabilized lattice map may be stored. In particular, the stabilized lattice map may be manifested as a currently accumulated average of previous frames, by averaging geo lattices generated from one or more, or all previous frames (besides outliers), adding a geo lattice or a weighted geo lattice of a current frame, and extracting a smoothed lattice for the current frame from the sum of the geo lattices from previous frames and of the current frame. The built smooth, stabilized lattice map and/or a corresponding geo lattice may be stored in the storage unit 169 for real-time or near-real time, or dynamic update. For instance, when a new video frame of the video stream is collected by the serial vehicle, the new video frame may go through the above-described geo lattice construction module 162, which may construct a new geo lattice. The new geo lattice and the previously stored geo lattice or the previously stored geo lattice map stored in the storage unit 169 may go through the image registration module 163 and the geo coordinates smoothing module 164 to update the geo coordinates of the points in an updated geo lattice, to generate an updated geo lattice map.

Figure 3:
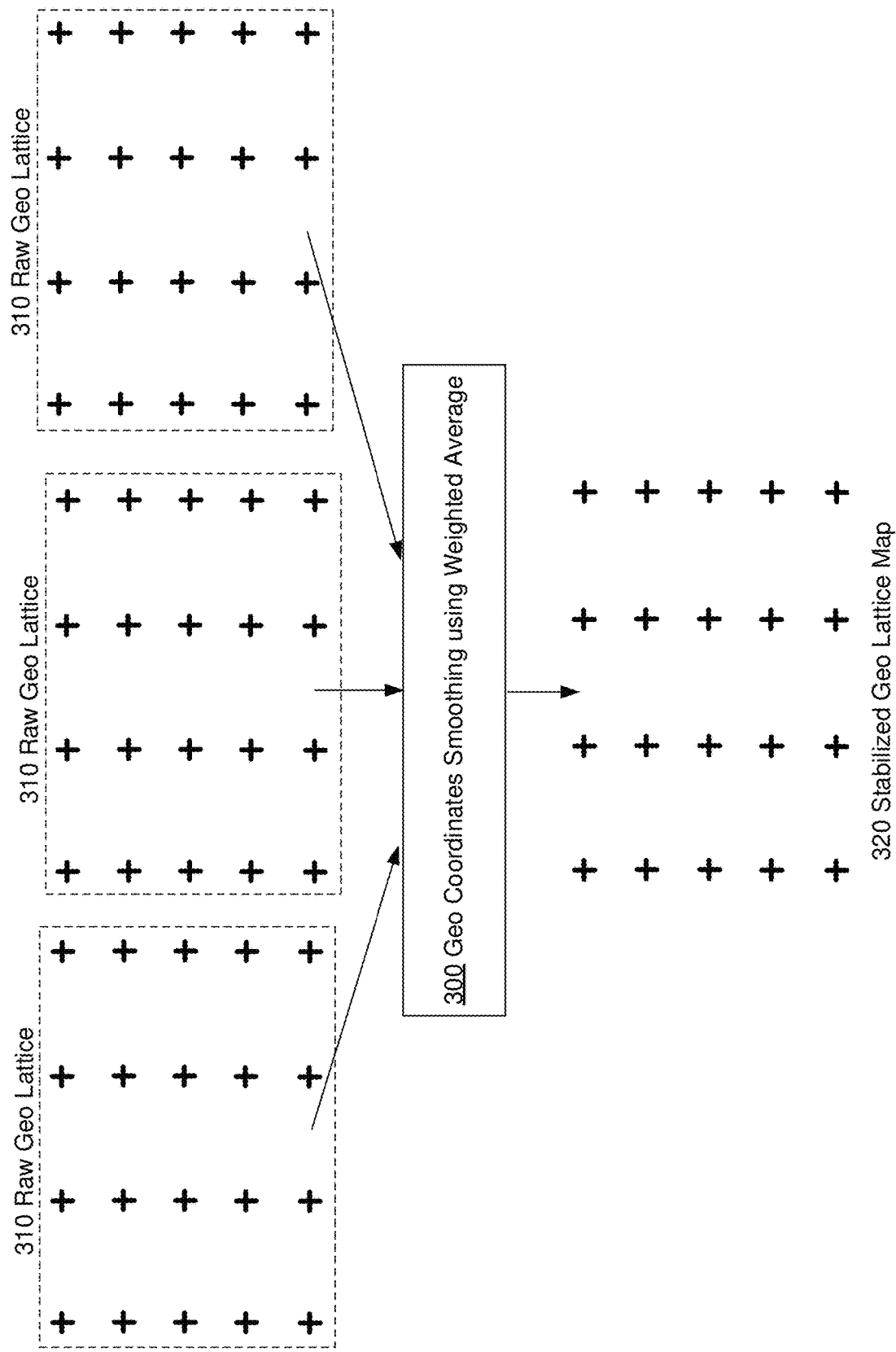
FIG. 3 illustrates an example diagram for generating a stabilized geo lattice map based on UAV-collected images, in accordance with various embodiments.

FIG. 3 illustrates an example diagram for generating a stabilized geo lattice map based on UAV-collected images, in accordance with various embodiments. The "images" here may include video frames or photos collected by cameras, multi-dimensional reconstructions of objects collected by synthetic-aperture radar (SAR), another suitable form of images, or any combination thereof. The diagram in FIG. 3 may correspond to the geo coordinates smoothing module 164 and/or the lattice map building module 165 described in FIG. 1B.

As described above, when a UAV collects images, it computes internal coordinates for each image using a sensor model based on various sensor data. Any small errors in the sensor model or in the sensor data may cause jitters of the internal coordinates on the images. These jitters may cause unpleasant user experience as well as hardship for any subsequent data processing (e.g., object tracking). For instance, the three raw geo lattices 310 illustrated in FIG. 3 may be constructed respectively for three consecutive video frames collected by a UAV. Each geo lattice 310 may include points. The UAV may compute the internal geo coordinates for the points in the geo lattices 310 based on the sensor model and sensor data. These geo lattices 310 may then go through a geo coordinates smoothing process 300 using a weighted average algorithm. For instance, the geo coordinates from a more recent video frame may be assigned with a higher weight, and the geo coordinates from a less recent video frame may be assigned with a lower weight. Thus, the geo lattices are weighted based on their temporal sequence. The geo coordinates smoothing process 300 may output a stabilized geo lattice map 320 by averaging the geo coordinates in the raw geo lattices 310 according to their corresponding weights and overlaying a current video frame onto the stabilized geo lattice map 320.

In some embodiments, this weighted-average geo coordinates smoothing process 300 may be executed when updating the stabilized geo lattice map based on the new incoming video frames. For instance, the stabilized geo lattice map 320 may include a point whose stabilized geo coordinates are computed by averaging a first number of internal geo coordinates from the raw geo lattice 310. When the newly collected video frame includes a corresponding point with a new pair of internal coordinates, the stabilized geo lattice map 320 may be updated by: assigning different weights to the stabilized geo coordinates of the points in the stabilized geo lattice map 320 and to the new pair of internal coordinates in the newly collected video frame, and computing a weighted average of the geo coordinates for the points based on the stabilized geo coordinates, the new pair of internal coordinates, and their respective weights. In some embodiments, the existing (e.g., to-be-updated) stabilized geo coordinates of the point may be assigned a greater weight than the new pair of internal coordinates. For example, assuming the stabilized geo coordinates are computed based on X number of historical video frames, not counting the current or most recent video frame, the weight for the stabilized geo coordinates may be X times greater than the new pair of internal coordinates.

Figure 4:
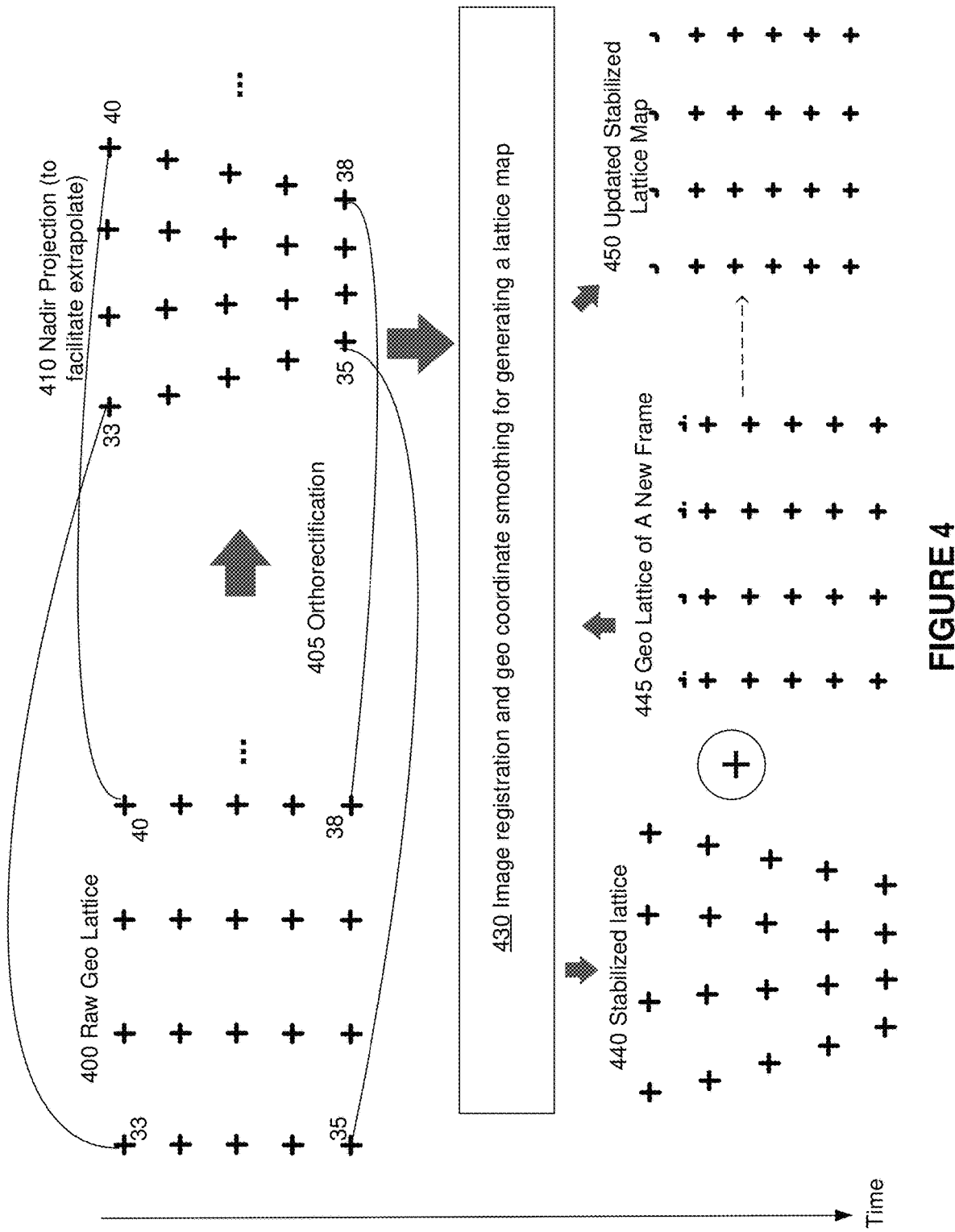
FIG. 4 illustrates an example diagram for updating or building a geo lattice map based on newly collected images based on image projection, in accordance with various embodiments.

FIG. 4 illustrates an example diagram for updating or building a geo lattice map based on newly collected images based on image projection, in accordance with various embodiments. The georeferencing stabilization described above may work well when the UAV is hovering and capturing video streams from roughly the same area. In practice, the UAV may relocate or the camera on the UAV may pan to capture video frames of locations not previously captured. In these cases, the new video frame may include some new geo coordinates that are determined based on the UAV's sensor model but have no existing geo coordinates to average with. These types of single observations may lead to jitter and unstable presentations for these newly observed areas. To address this issue, each of the captured video frames may be orthorectified to estimate a homography matrix for a Nadir projection of the video frames (representing the field of view of the UAV). The Nadir projection allows extrapolation of the lattice map beyond the existing borders of the captured video frames. This way, a newly captured video frame with a new area may be averaged with the Nadir projection using extrapolation to get a new stable geo lattice.

In some embodiments, a raw geo lattice 400 constructed on a video frame may go through an orthorectification 405 to generate a Nadir projection 410. The purpose of generating the Nadir projection 410 is to align the lattice 400 so that a distance between adjacent latitude/longitude demarcations is actually even (e.g., by aligning latitude with Y axis and longitude with X axis). As shown in FIG. 4, the top of the video frame (represented by the lattice 400) has a geo range of 33-40 (with the left top corner being 33 and the right top corner being 40) and the bottom of the video frame has a geo range of 45-38. So the transformed version or the Nadir projection 410 has an upper portion more stretched than the lower part. This process would've been simple if the lattice does not contain noisy data (e.g., by taking minimum (latitude), minimum(longitude), maximum(latitude), maximum(longitude) and generating evenly based grid based on those values). However, the lattice is almost always noisy, so the above linear transformation is inaccurate. For these reasons, an iterative method, such as RANSAC, may be applied to perform the transformation. RANSAC refers to an iterative method to estimate parameters of a mathematical model from a set of observed data that contains outliers (noisy data), when outliers are to be accorded no influence on the values of the estimates in reality.

This orthorectification 405 may also include estimating the homography matrix transforming any given raw geo lattice 400 to the Nadir projection 410. In some embodiments, instead of estimating the homography matrix between every raw lattices and the Nadir projection 410 and between every two raw lattices, a chain method may be used to reduce the computational cost. For instance, assuming there are three frames (Frame #1, Frame #2, Frame #3) and one Nadir projection 410, only the homography matrices between the consecutive frames, and the homography matrix between the last frame and the Nadir projection need to be computed. This process may be denoted as (Nadir projection)<=(Frame #3)<=(Frame #2)<=(Frame #1), where "<=" represents a homography matrix. The homography matrix between Frame #1 and the Nadir projection 410 may be conveniently computed by multiplying all the homography matrices in the chain (e.g., three homography matrices in the above example). Based on the lattices 400, the Nadir projection 410, and the homography matrices corresponding to the lattices 400, a stabilized lattice (e.g., a stabilized Nadir projection of the lattice map) may be generated through the image registration and geo coordinate smoothing 430 process.

When the newly captured video frame 445 (with a new area denoted with dotted line) is received, it may be averaged with the stabilized lattice 440 using extrapolation in the image registration and geo coordinate smoothing 430 process to generate an updated stabilized lattice map 450. The "average" here may refer to weighted average described in FIG. 3, where the geocoordinates in the stabilized lattice map 440, estimated geo coordinates (through extrapolation) beyond the stabilized lattice map 440, and the internal geo coordinates in the new video frames may be respectively assigned with different weights. The weights may be proportional to the number of observations of the corresponding point in the corresponding lattices. For instance, the number of observations for a point in the new video frames may be determined as one, and the number of observations of the corresponding point in the stabilized lattice map 440 may be determined as the number of historical observations of that point.

The following descriptions introduce multiple technical improvements to the above-described georeferencing stabilization.

FIGS. 5A-5I illustrate an example technical implementation for generating a smoothed, orthorectified lattice map, performed, for example, by the geo coordinates smoothing module 164 and/or the lattice map building module 165. A first media frame 502 may be obtained, for example, from one or more sensors. A homography matrix $H_1$-Matrix 512 to transform from a perspective or coordinate system of the first media frame 502 to a perspective or coordinate system of a first dense lattice 522 may be determined. The first dense lattice 522 may be a transformed version of, or a result of conversion from the geo lattice 310 of FIG. 3, and/or from a lattice as illustrated in FIG. 2A or 2B, which may have undergone an orthorectification process 405 in FIG. 4. The first dense lattice 522 may have been converted from a five-by-five lattice (e.g., of the geo lattice 310) to a denser one, such as 1280-by-720, meaning that the first dense lattice 522 encompasses 1280 by 720 points or pixels. The first media frame 502 may have coordinates represented or indicated by two separate matrices or columns, or otherwise have coordinates, parameters, or attributes that represent or indicate two types of information. The first type of information represents latitudes, and the second type of information represents longitudes. The first dense lattice 522 may have coordinates represented or indicated by three separate matrices or columns, or otherwise have coordinates, parameters, or attributes that represent or indicate three types of information, a first representing latitudes, a second representing longitudes, and a third representing weights (e.g., of the first dense lattice 522 relative to other dense lattices, and/or of individual latitudes or longitudes).

Figure 5C:
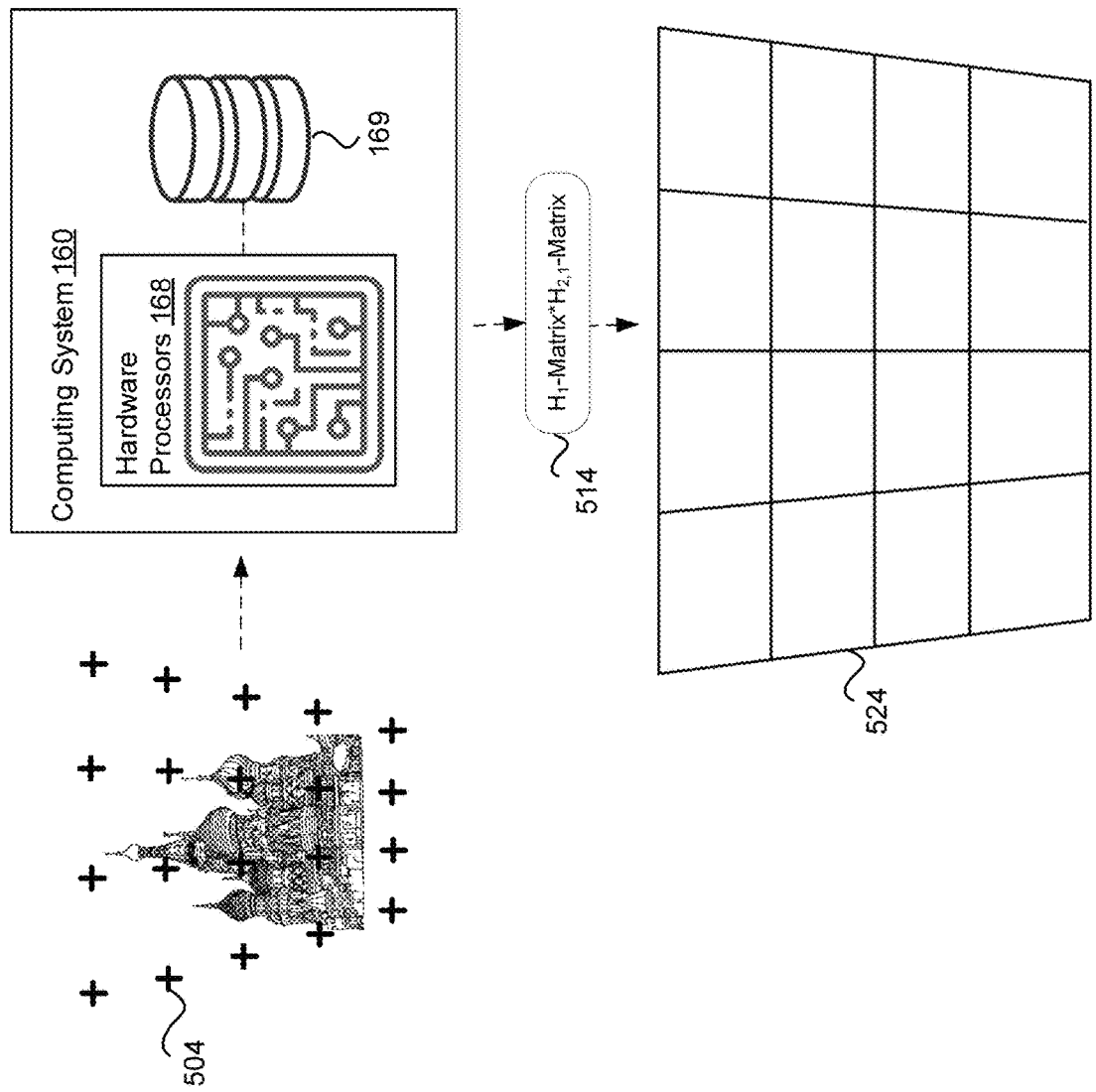

In FIG. 5B, an image registration process may be used to obtain a transformation matrix 503, denoted as $H_{2,1}$-matrix 503, between a second media frame 504 and the first media frame 502, in a process similar to that described with respect to the image registration module 163. From the second media frame 504, a second dense lattice 524 may be generated, using a same or similar principle as that of the generation of the first dense lattice 522. Therefore, to obtain a transformation between the second media frame 504 and the second dense lattice 524, a homography matrix, resulting from matrix multiplication of the $H_1$-Matrix 512 and the $H_{2,1}$-matrix 503, or a matrix 514 denoted as $H_1$-Matrix* $H_{2,1}$-Matrix 514, may be computed, as illustrated in FIG. 5C. The second dense lattice 524 may deviate from the first dense lattice 522, although they should match closely.

Figure 5D:
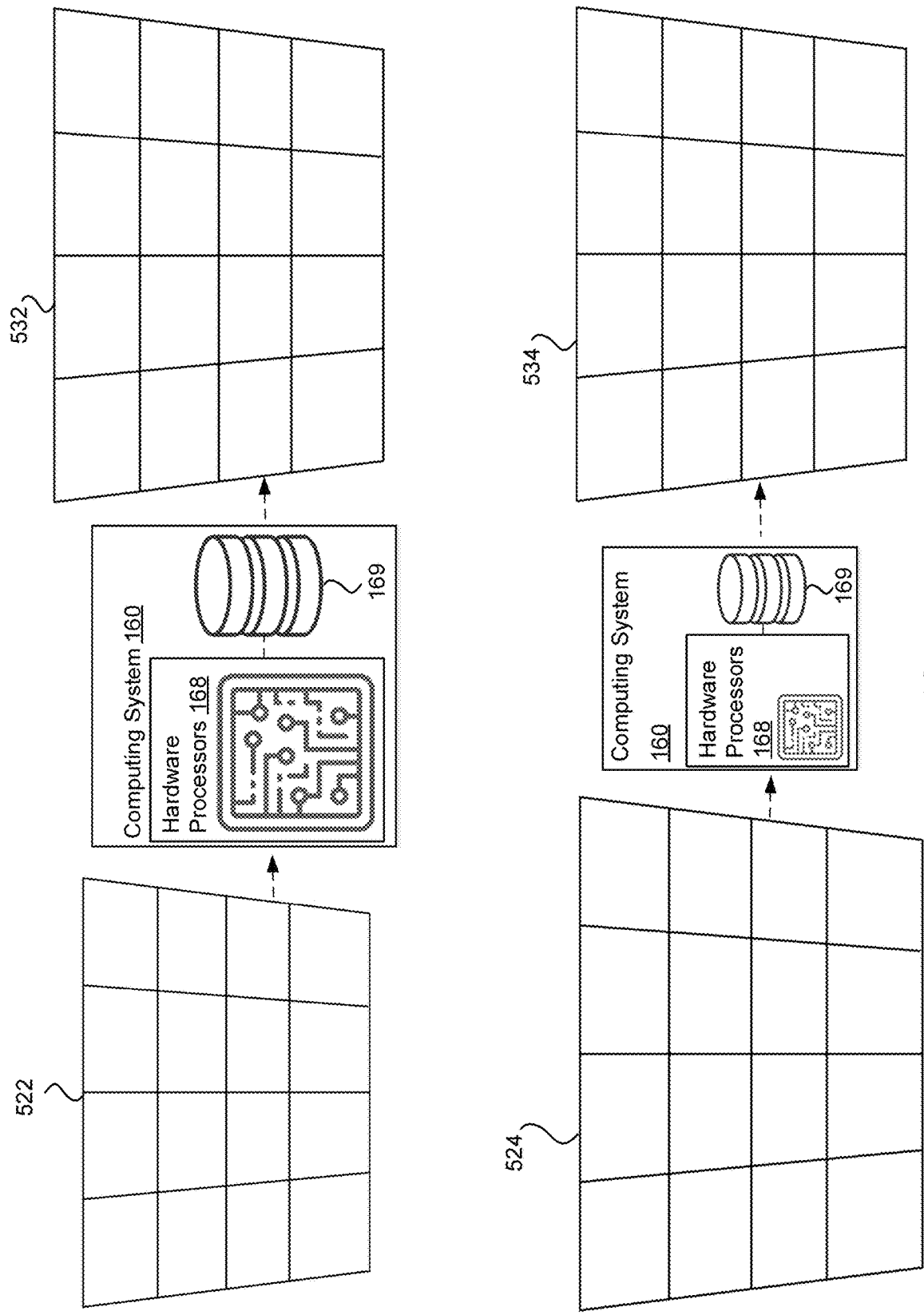

In FIG. 5D, one or both of the first dense lattice 522 and the second dense lattice 524 may be modified or extrapolated so that a resulting size of a modified or extrapolated (hereinafter "modified") first dense lattice 532 and a modified second dense lattice 534 are the same. This modification may entail extracting portions of the first dense lattice 522 and/or the second dense lattice 524, and/or adding additional entries in first dense lattice 522 and/or the second dense lattice 524, so that the modified first dense lattice 532 and the modified second dense lattice 534 have a same size. Additionally or alternatively, the $H_1$-Matrix*$H_{2,1}$-Matrix 514, the $H_1$-Matrix 512, and/or the $H_{2,1}$-Matrix 503, may be modified (e.g., entries added or removed or extracted from) such that they are square matrices and/or invertible (e.g., having a nonzero determinant), which may affect the generation or computation of the modified first dense lattice 532 and the modified second dense lattice 534. The entries added may include a row of all "zeros" except for a single "one," in which a location of the single "one" depends on a relative location of the added row within the matrix. For example, if the added row appears on a last row of the matrix, then the single "one" may be a last, or right-most entry. If the added row appears on a first row of the matrix, then the single "one" may be a first, or left-most entry. More generally, a relative position or location of the single "one" may correspond to, or match, a number of the row within the matrix that this added row appears in. For example, if the added row appears in a fifth row of the matrix, then the single "one" may appear in a fifth entry of the row.

Figure 5E:
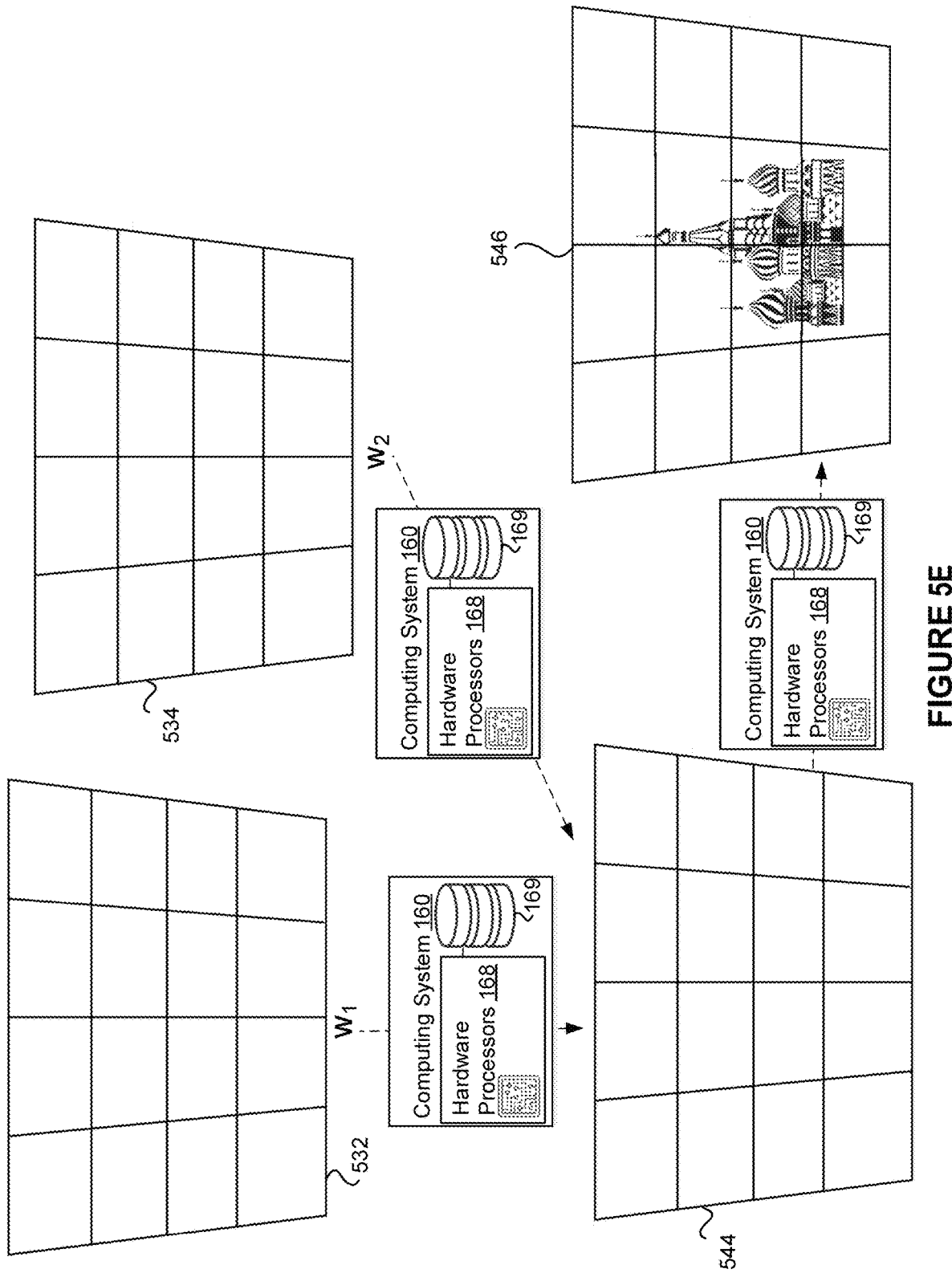

Next, in FIG. 5E, the modified first dense lattice 532 and the modified second dense lattice 534 may be added element-wise, pixel-wise, or point-wise based on respective weights $w_1$ and $w_2$ of the modified first dense lattice 532 and the modified second dense lattice 534, to obtain a weighted lattice 544. For example, if $w_1$ and $w_2$ are 25 percent and 75 percent, respectively, then if a point of the modified first dense lattice 532 has a coordinate (e.g., latitude or longitude) of 1 and a corresponding point of the modified second dense lattice 534 has a coordinate of 2, then the weighted lattice 544 may have a coordinate of 1.75. A matrix transformation, an inverse of the $H_1$-Matrix*$H_{2,1}$-Matrix 514, may be applied to the weighted lattice 544, to obtain a smoothed lattice map 546, upon which features of the second media frame 504 may be overlaid.

Figure 5F:
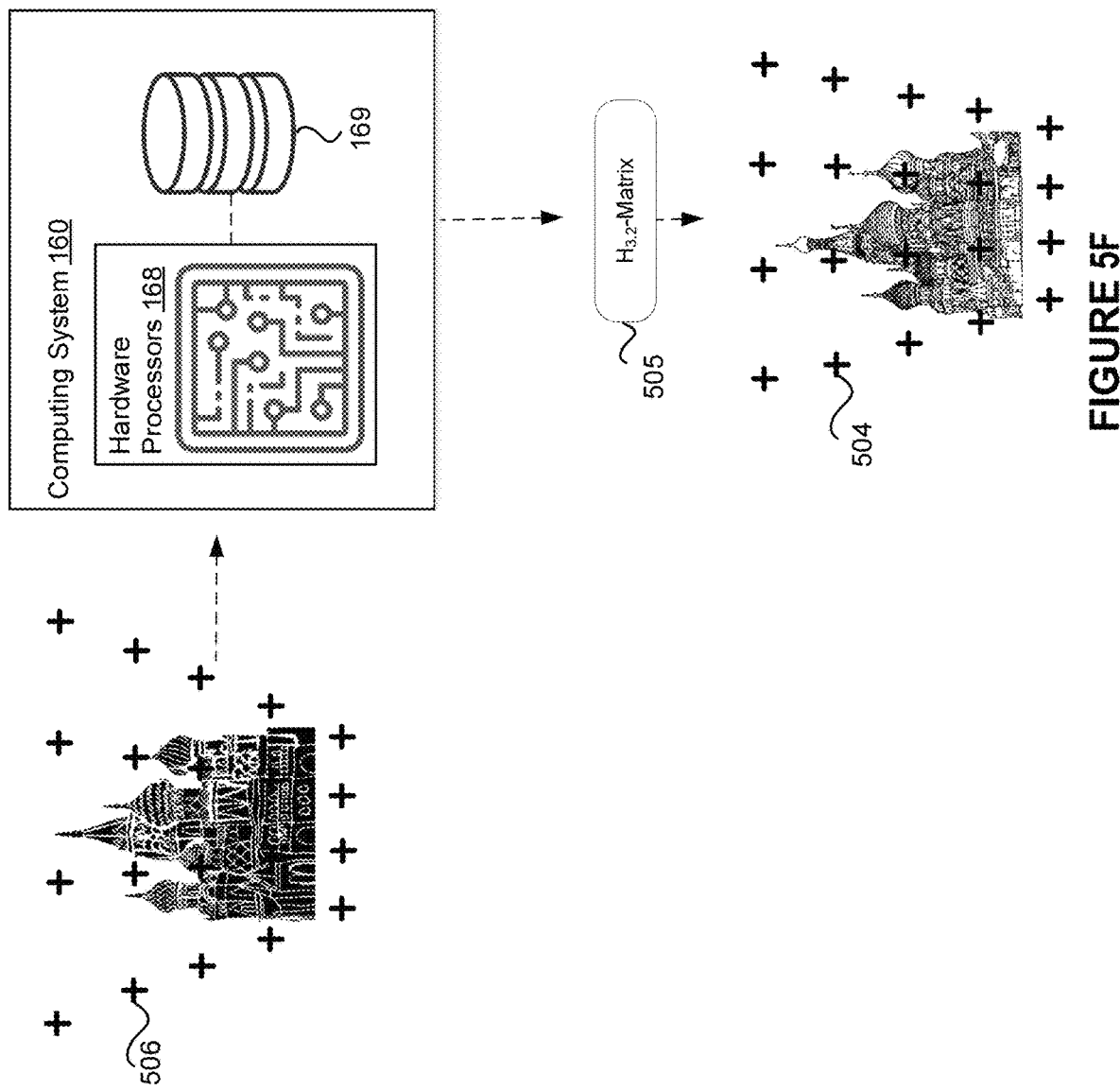
Figure 5G:
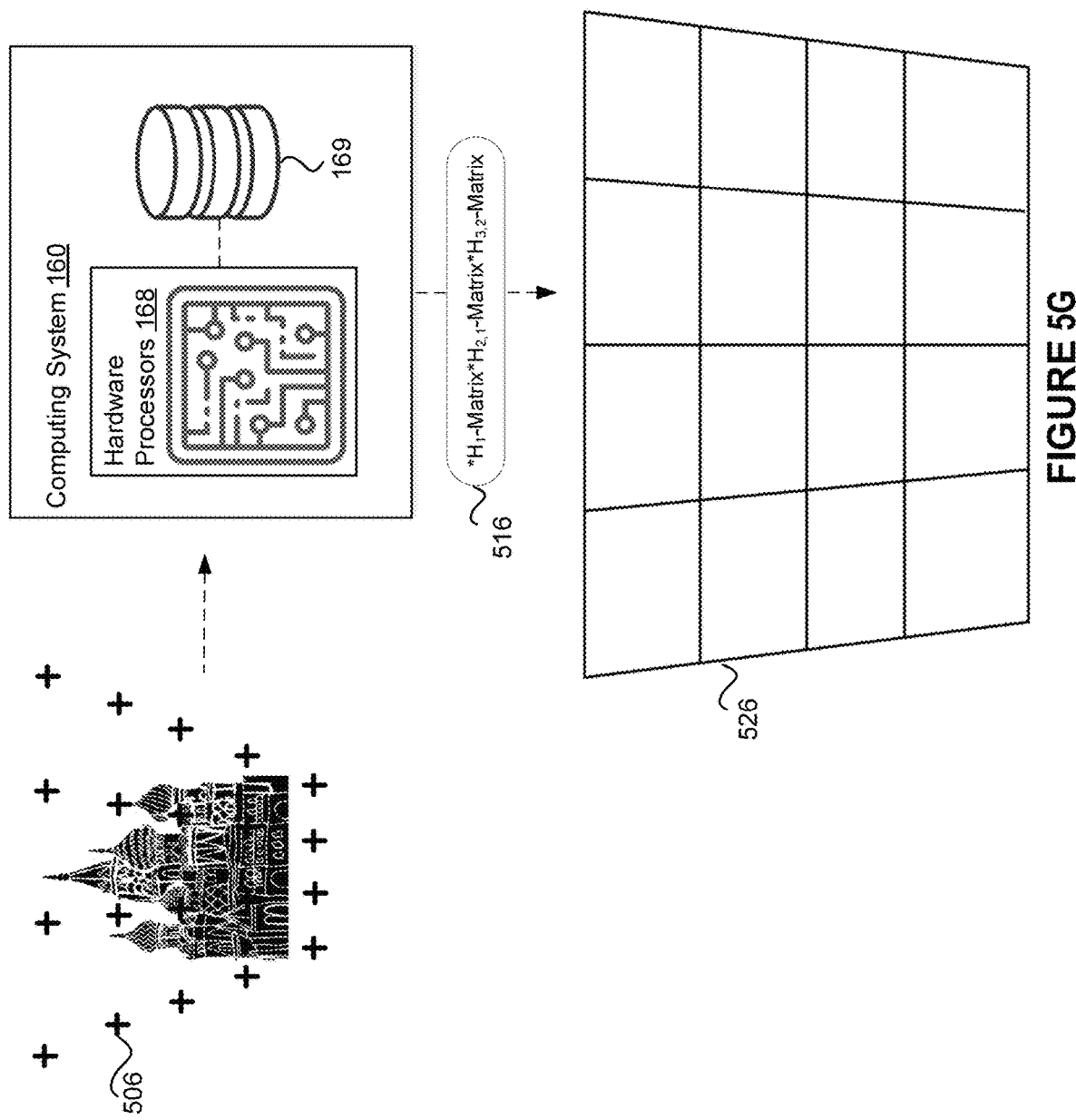

FIGS. 5F-5I expand the process described above for subsequent frames. In FIG. 5F, an image registration process may be used to obtain a transformation matrix 505, denoted as $H_{3,2}$-matrix 505, between a third media frame 506 and the second media frame 504, in a process similar to that described with respect to the image registration module 163. From the third media frame 506, a third dense lattice 526 may be generated, using a same or similar principle as that of the generation of the first dense lattice 522 and the second dense lattice 524. Therefore, to obtain a transformation between the third media frame 506 and the third dense lattice 526, a homography matrix, resulting from matrix multiplication of the $H_1$-Matrix 512, the $H_{2,1}$-Matrix 503 and the $H_{3,2}$-matrix 505, or a matrix 516 denoted as $H_1$-Matrix*$H_{2,1}$-Matrix*$H_{3,2}$-Matrix 516, may be computed, as illustrated in FIG. 5G. The third dense lattice 525 may deviate from the second dense lattice 524 and/or the first dense lattice 522, although they should match closely.

In FIG. 5H, one or both of the smoothed lattice map 546 and the third dense lattice 526 may be modified or extrapolated so that a resulting size of a modified or extrapolated (hereinafter "modified") smoothed lattice map 566 and a modified third dense lattice 556 are the same. This modification may entail extracting portions of the smoothed lattice map 546 and/or the third dense lattice 526, and/or adding additional entries in the smoothed lattice map 546 and/or the third dense lattice 526, so that the modified smoothed lattice map 566 and the modified third dense lattice 556 have a same size. Additionally or alternatively, the $H_1$-Matrix*$H_{2,1}$-Matrix*$H_{3,2}$-Matrix 516, the $H_{3,2}$-Matrix 505, the $H_1$-Matrix 512, and/or the $H_{2,1}$-Matrix 503, may be modified (e.g., entries added or extracted from) such that they are square matrices and/or invertible (e.g., having a nonzero determinant), which may affect the generation or computation of the modified smoothed lattice map 566 and the modified third dense lattice 556.

Figure 5I:
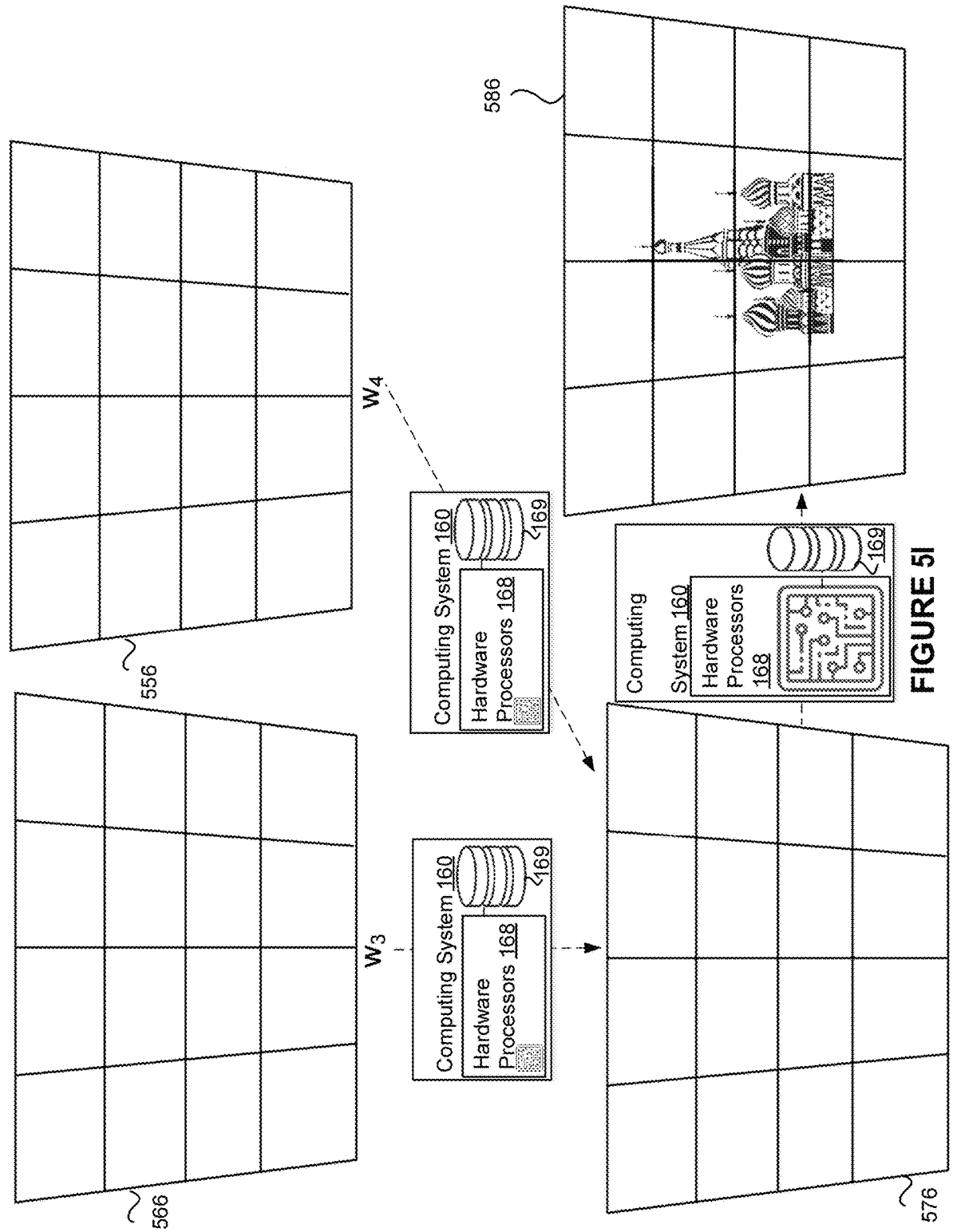

Next, in FIG. 5I, the modified smoothed lattice map 566 and the modified third dense lattice 556 may be added element-wise, pixel-wise, or point-wise based on respective weights $w_3$ and $w_4$ of the modified smoothed lattice map 566 and the modified third dense lattice 556, to obtain a second weighted lattice 576. A matrix transformation, an inverse of the $H_1$-Matrix*$H_{2,1}$-Matrix*$H_{3,2}$-Matrix 516, may be applied to the second weighted lattice 576, to obtain a smoothed lattice map 586, upon which features of the third media frame 506 may be overlaid.

Therefore, once subsequent media frames are obtained, the process described above is repeated. First, a matrix resulting from image registration of a current or most recently obtained media frame (at time $t_n$, for example) and a most recent, consecutive, or adjacent previous frame (at time $t_{n-1}$, for example) may be obtained. This matrix may represent a transformation between the most recently obtained media frame and a consecutive or adjacent previous frame. Next, a lattice projection, or lattice map projection, of the most recently obtained media frame may be obtained via a chain method, using this matrix multiplied to a previous transformation matrix of the previous frame, according to a same principle described above with respect to the $H_1$-Matrix*$H_{2,1}$-Matrix*$H_{3,2}$-Matrix 516, and the $H_1$-Matrix*$H_{2,1}$-Matrix 514. Assuming that the most recently obtained media frame is an n-th frame, then the matrix to transform the most recently obtained media frame to the lattice projection may be represented as $H_1$-Matrix*$H_{2,1}$-Matrix*$H_{3,2}$-Matrix* . . . *$H_{n-1,n}$-Matrix.

Next, this obtained lattice projection and/or a previous modified smoothed lattice map of the previous iteration may be extrapolated so that they have a same spatial size. Next, following extrapolation, a weighted sum of the previous modified smoothed lattice map of the previous iteration and the obtained lattice projection may be computed. Lastly, a matrix transformation, an inverse of the $H_1$-Matrix*$H_{2,1}$-Matrix*$H_{3,2}$-Matrix* . . . *$H_{n-1,n}$-Matrix, may be applied to the weighted sum, to obtain an updated smoothed lattice map corresponding to the current media frame, upon which features of the current media frame may be overlaid.

Figure 6A:
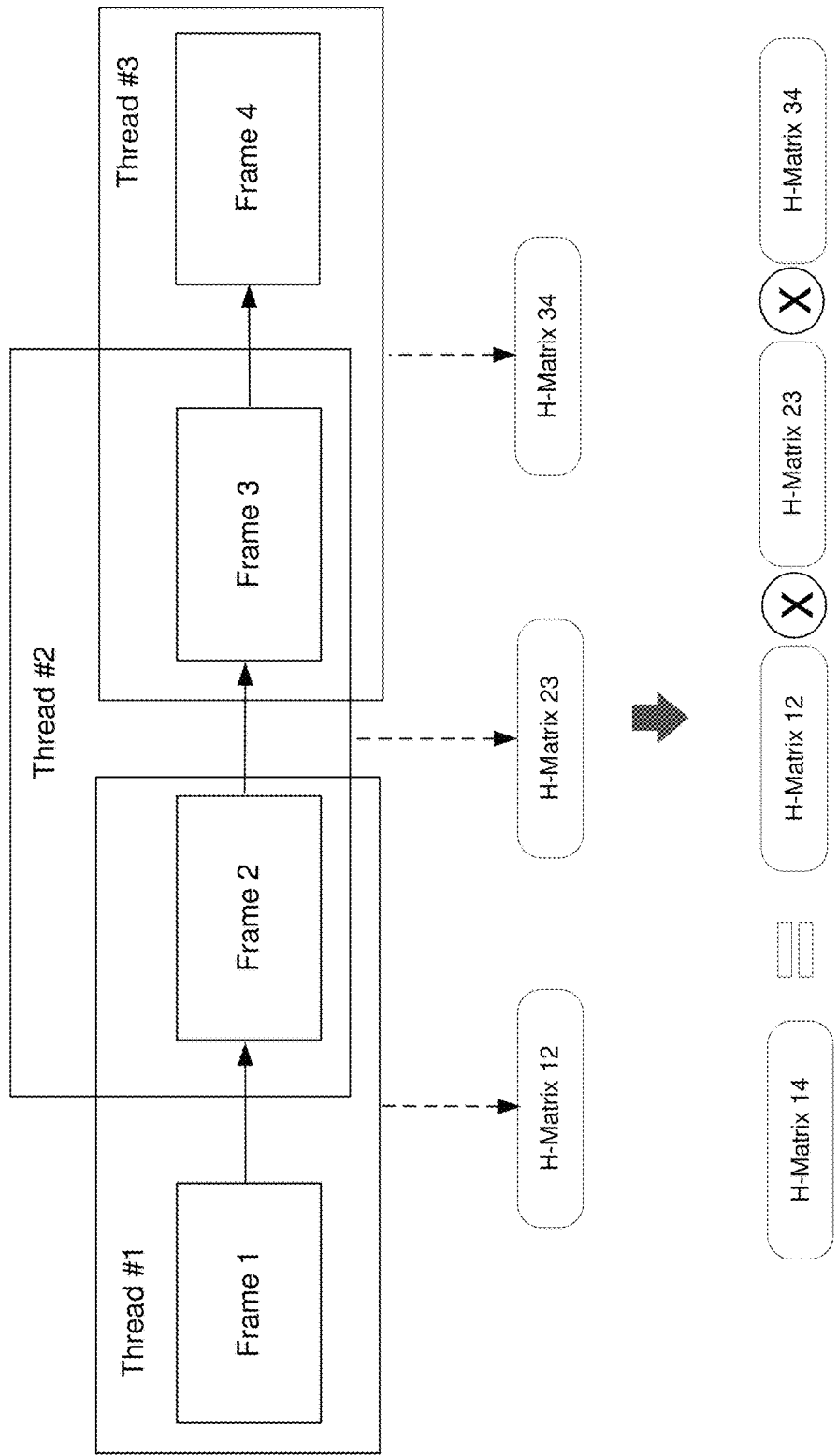
FIGS. 6A, 6B, and 6C illustrate further example technical implementations for improving the efficiency of georeferencing stabilization, in accordance with various embodiments.

FIG. 6A illustrates an example technical implementation for improving the efficiency of georeferencing stabilization, in accordance with various embodiments. During the image registration process 250 described in FIG. 2B (corresponding to the image registration module 163), the transformation matrix (e.g., homography matrix) between any two video frames may be required for image registration. For instance, among the four video frames illustrated in FIG. 6A, an object or a feature may appear in Frame 1 and Frame 4, but not Frame 2 or Frame 3. In this case, the image registration may need to compute the homography matrix between Frame 1 and Frame 4, or frames that actually have a common object, entity, or feature. To have the homography matrices between any pair of video frames ready for use, the image registration process may compute a number of N*(N−1)/2 homography matrices, where N refers to the number of video frames.

However, the homography matrix computation may include AKAZE feature detection and embedding, KNN feature matching, and RANSAC homography estimation, which could be computationally expensive. In order to reduce the computation load, in some embodiments, only the homography matrices between consecutive video frames may go through the image registration process, and the homography matrix between any two non-consecutive video frames may be directly computed based on the homography matrices corresponding to the intermediate video frames between the two non-consecutive video frames. For instance, the homography matrices between Frame 1 and Frame 2, Frame 2 and Frame 3, Frame 3 and Frame 4, . . . , may be computed in parallel using multiple threads, and denoted as $HMatrix_{ij}$, where i refers to the index of the source frame and j refers to the index of the target frame (e.g., $HMatrix_{23}$ refers to the transformation matrix between Frame 2 and Frame 3). In order to compute the homography matrix between Frame X and Frame Y, the matrices $HMatrix_{(X)(X+1)}$, $HMatrix_{(X+1)(X+2)}$, . . . , and $HMatrix_{(Y-1)(Y)}$ may be multiplied to obtain $HMatrix_{XY}$. Compared to computing $HMatrix_{XY}$ through the expensive image registration process, the direct matrix multiplication approach is more efficient and lightweight, which makes the approach more edge computing-friendly.

Figure 6B:
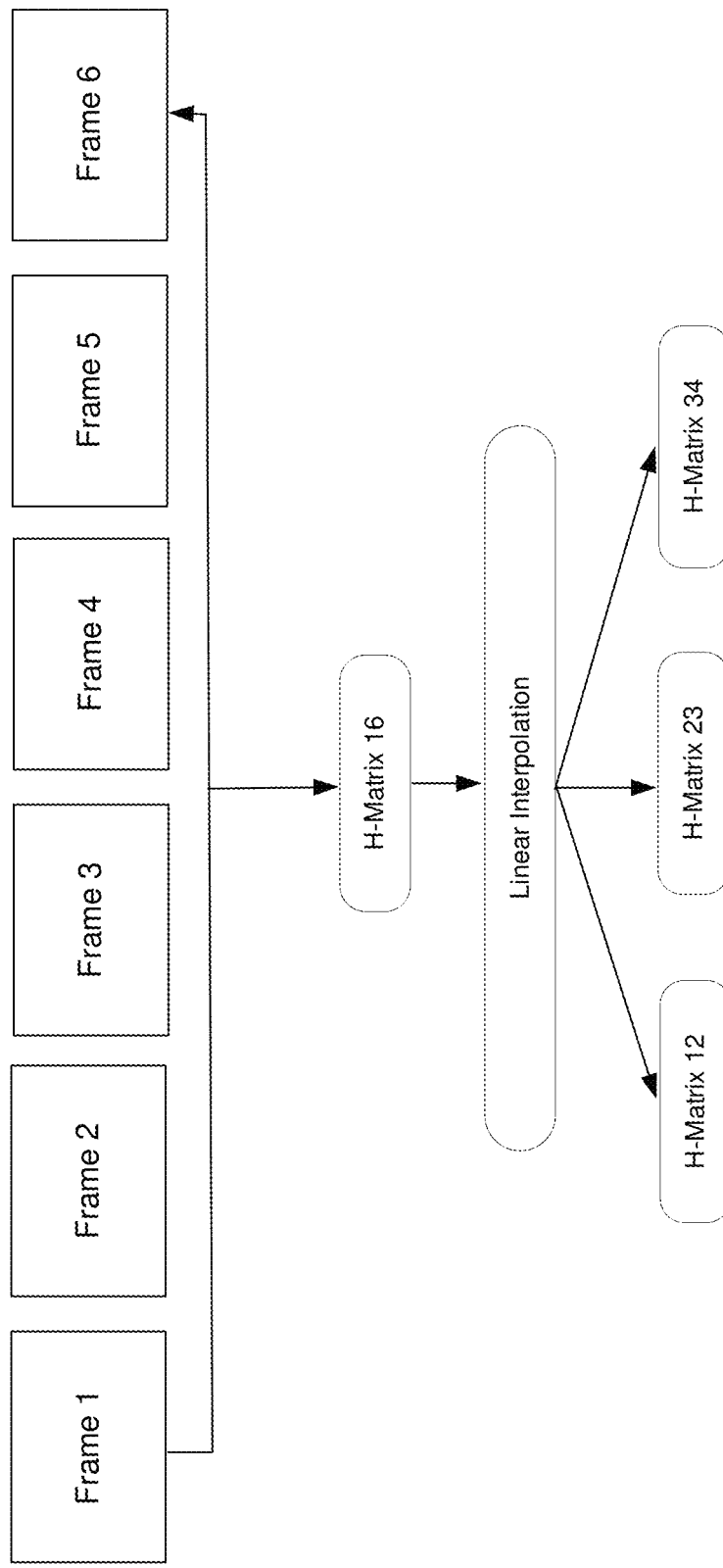

FIG. 6B illustrates another example technical implementation for improving the efficiency of georeferencing stabilization, in accordance with various embodiments. The approach illustrated in FIG. 6B is to further reduce the workload for the image registration process 250 described in FIG. 2B (corresponding to the image registration module 163).

In some embodiments, the image registration process may be executed for every K frames instead of for every frame, where K is an integer greater than one. As shown in FIG. 6B, the six video frames (Frame 1 to Frame 6) may only need to run image registration for Frame 1 and Frame 6 once and generate one homography matrix $HMatrix_{16}$, and all the intermediate homography matrices may be obtained by linear interpolation. This way, the number of frames for image registration is further reduced.

Figure 6C:
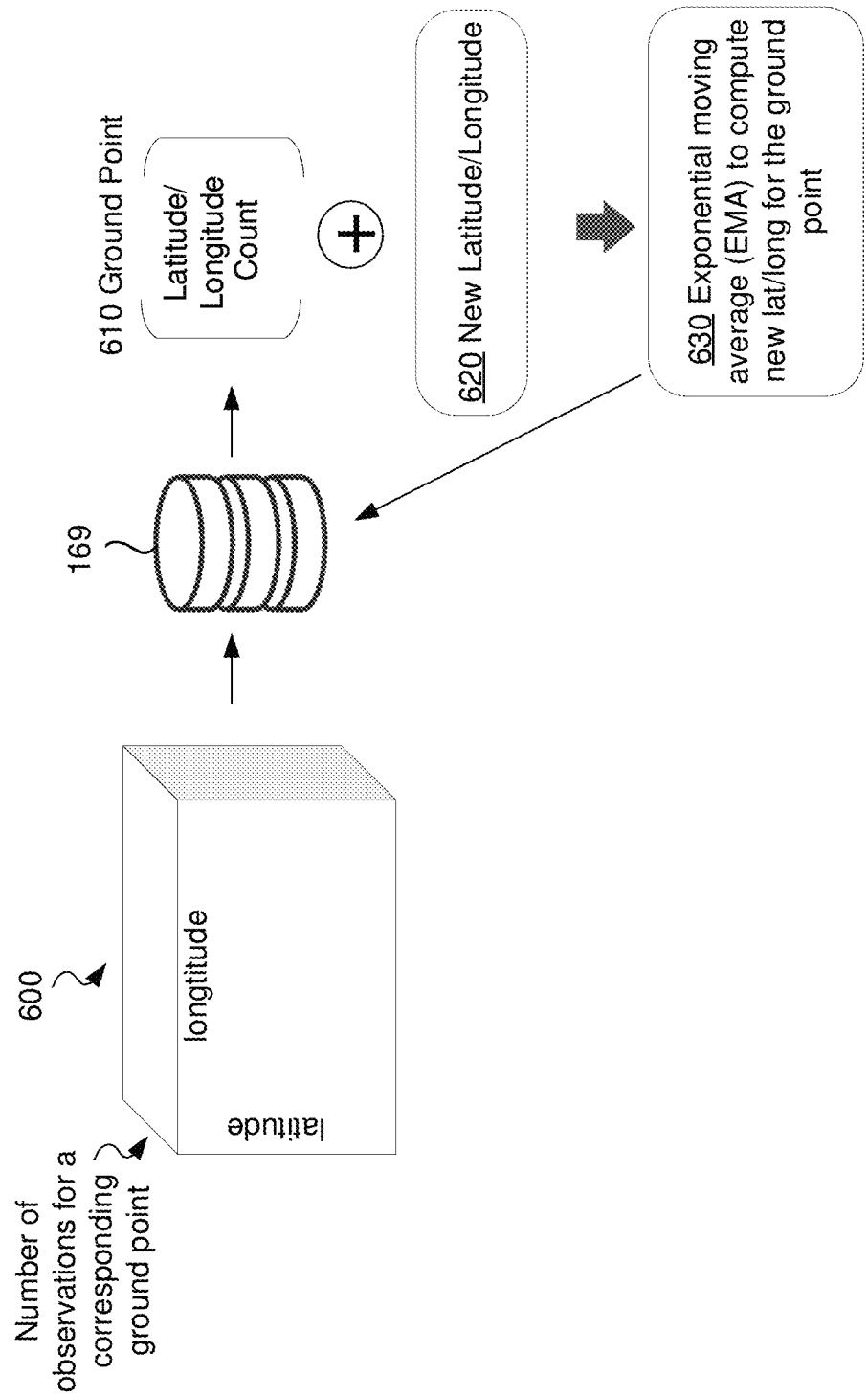

FIG. 6C illustrates yet another example technical implementation for improving the efficiency of georeferencing stabilization, in accordance with various embodiments. The approach illustrated in FIG. 6C is to minimize the storage footprint of the stabilized lattice map computed using the flows described in FIG. 1B, FIG. 2B, FIG. 3 and FIG. 4. Even though the geo coordinates for a given point on the lattice map are technically determined based on the average of all observations of the point, it is unnecessary to store all the observations.

In some embodiments, the stabilized lattice map may be built in a form of three-channel dense matrix 600, with a first channel corresponding to latitude, a second channel to longitude, and a third channel corresponding to the number of observations of a corresponding point or a corresponding ground point in the previous geo lattices. For example, the ground point 610 in FIG. 6C may include latitude/longitude values as well as a count of the observations of the ground point that have been used to compute the latitude/longitude values. When a newly obtained video frame has a new set of latitude/longitude values 620 for the ground point, an exponential moving average (EMA) may be calculated based on the new set of latitude/longitude values 620 with the old latitude/longitude values in 610. The EMA may assign different weights to the new latitude/longitude values 620 and the old latitude/longitude values in 610 to compute the updated average latitude/longitude values, for example, by:

$$\frac{N*(\text{old latitude/longitude})+(\text{new latitude/longitude})}{N+1}$$

where N refers to the count of the observations of the ground point in 610. Then the updated average latitude/longitude values may be stored in the storage unit to represent the ground point 610. The count may also be increased. This way, the lattice map in the storage unit may keep a running average of the geo coordinates of the ground points and be updated in real-time without storing all historical data.

FIG. 7 illustrates a downstream action to be performed following the orthorectification which generates a stabilized lattice map. In particular, further operations on the resulting orthorectified frames may be performed, such as feature extraction, feature analysis, direct measurement, and/or other transformations. As specific, non-limiting examples, these further operations may include extracting and/or tracking common entities that are present across different media frames. These entities may be either static or dynamic. As a result of the orthorectification, precise and/or accurate locations, orientations, velocities, accelerations, and/or other parameters of an entity may be obtained across the different frames. Therefore, identification of a particular entity and/or a feature of a particular entity may be elucidated. For example, if two features of an entity that appear similar, and/or if two entities are located in proximity to each other, confusion regarding identifications of the two features and/or the two entities may be reduced or avoided as a result of the orthorectification, which generates accurate geo-coordinates. Particularly when a concentration or density of a specific entity and/or feature is high within a particular region, and distinguishing the different entities and/or features is otherwise difficult or infeasible, the stabilized lattice map, as generated by the mechanisms illustrated in any of FIGS. 1A, 1B, 2A, 2B, 3, 4, 5A-5I, and/or 6A-6C may aid in discerning between closely related features and/or entities of a same or similar type.

Other downstream actions that may be performed, additionally or alternatively, may encompass coordinating, planning, and/or executing an action to be performed with respect to a tracked entity, such as transmitting a message or signal to the entity (e.g., to stop or slow down travel, move in a certain direction and/or a certain velocity or acceleration, or to synchronize movement with another entity), transmitting information regarding the entity or parameters thereof to another device or computer, blocking, restraining, and/or restricting further movement of the entity, or triggering an alarm regarding the entity. In some examples, the computing system 160 may delegate one or more tasks to a different computing system in response to detecting certain conditions. As a particular example, aforementioned location, orientation, velocity, and/or accelerations of the entity may be obtained for a specified duration. If one or more specific parameters or characteristics of the entity, such as the aforementioned location, orientation, velocity, and/or accelerations, are outside of some threshold value or range, then additional monitoring and/or analysis of the entity may be undertaken or performed. This additional monitoring may be performed at higher frequency of capture, or capture rate, and/or at a higher capture or imaging resolution than previously. For example, images, video, and/or other media of the entity may be captured at a higher frequency, such as, from 1 Hz or one time per second to 2 Hz or two times per second. Additionally or alternatively, the parameters previously measured may be measured at a higher frequency, and/or additional parameters not previously measured may be measured.

As illustrated in FIG. 7, a captured entity 701 in sequential media frames 702, 704, and 706 may be fed into the computing system 160. If the computing system 160 detects that certain parameters or characteristics of the captured entity 701 deviate from threshold ranges or levels, historical parameters or characteristics, or historical changes in the parameters or characteristics of the captured entity 701, and/or historical changes in entities of similar or same types as the captured entity 701, then the computing system 160 may perform additional monitoring 708 and/or transmit instructions or protocols to a different computing component 710, for example, via an application programming interface (API) 711 to perform some action. The computing system 160 may also perform some action on its own. Such an action may include, as explained above, outputting an alert or flag to the captured entity 701 or to another entity regarding movements or activities of the captured entity 701, controlling or coordinating an action or movement of the captured entity 701, and/or deploying or coordinating a strategy or action in response to the captured movements or activities of the captured entity 701. In some examples, the computing system 160 may determine a particular action to perform depending on an extent to which a threshold is exceeded, which may indicate a severity or potential severity of a situation. For example, if a threshold is exceeded by a first amount, then the computing system 160 may perform outputting an alert. However, if the threshold is exceeded by a second amount, then the computing system 160 may perform deploying or coordinating a strategy or action.

The parameters or characteristics may be associated or relate to geo-coordinates of the captured entity 701. For example, between the media frames 704 and 706, the computing system 160 may detect that a change in geo-coordinates of the captured entity 701 deviates from a threshold range of changes over a specific time interval. Parameters and/or characteristics of the captured entity 701 may be logged in the storage unit 169 so that historical parameters or characteristics may be constantly updated to establish and update baseline or threshold levels.

Figure 8:
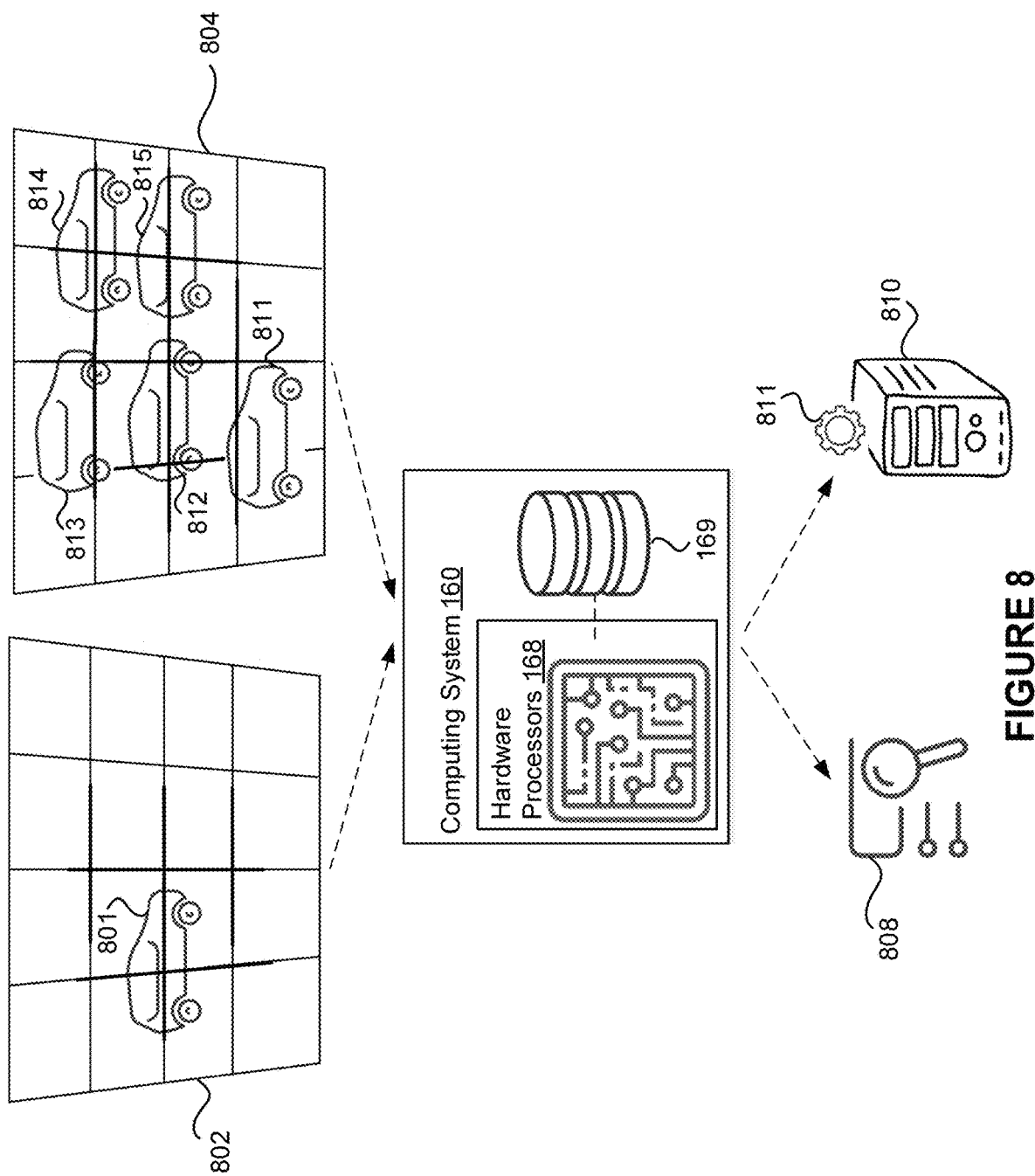

In FIG. 8, the computing system 160 may determine to perform some downstream action in response to a concentration or number of entities, or a change of the concentration or number of entities within a specified time interval, within a particular range of geolocations satisfying some threshold (e.g., a minimum or a maximum threshold). For example, the computing system 160 may determine that either a concentration of entities in a media frame 802, which contains only one entity 801 of a specified type, does not satisfy a threshold. However, in a subsequent media frame 804, the computing system 160 may determine that a number or concentration of entities 811, 812, 813, 814, and 815 of the specified type satisfies a threshold. Additionally or alternatively, the computing system 160 may determine that a rate of change of the concentration of entities 811, 812, 813, 814, and 815 from the media frame 802 to the subsequent media frame 804 satisfies a threshold rate of change. Thus, following the subsequent media frame 804, the computing system 160 may perform additional monitoring 808, transmit instructions or protocols to a different computing component 810, for example, via an application programming interface (API) 811 to perform some action, and/or perform some action itself.

Figure 9:
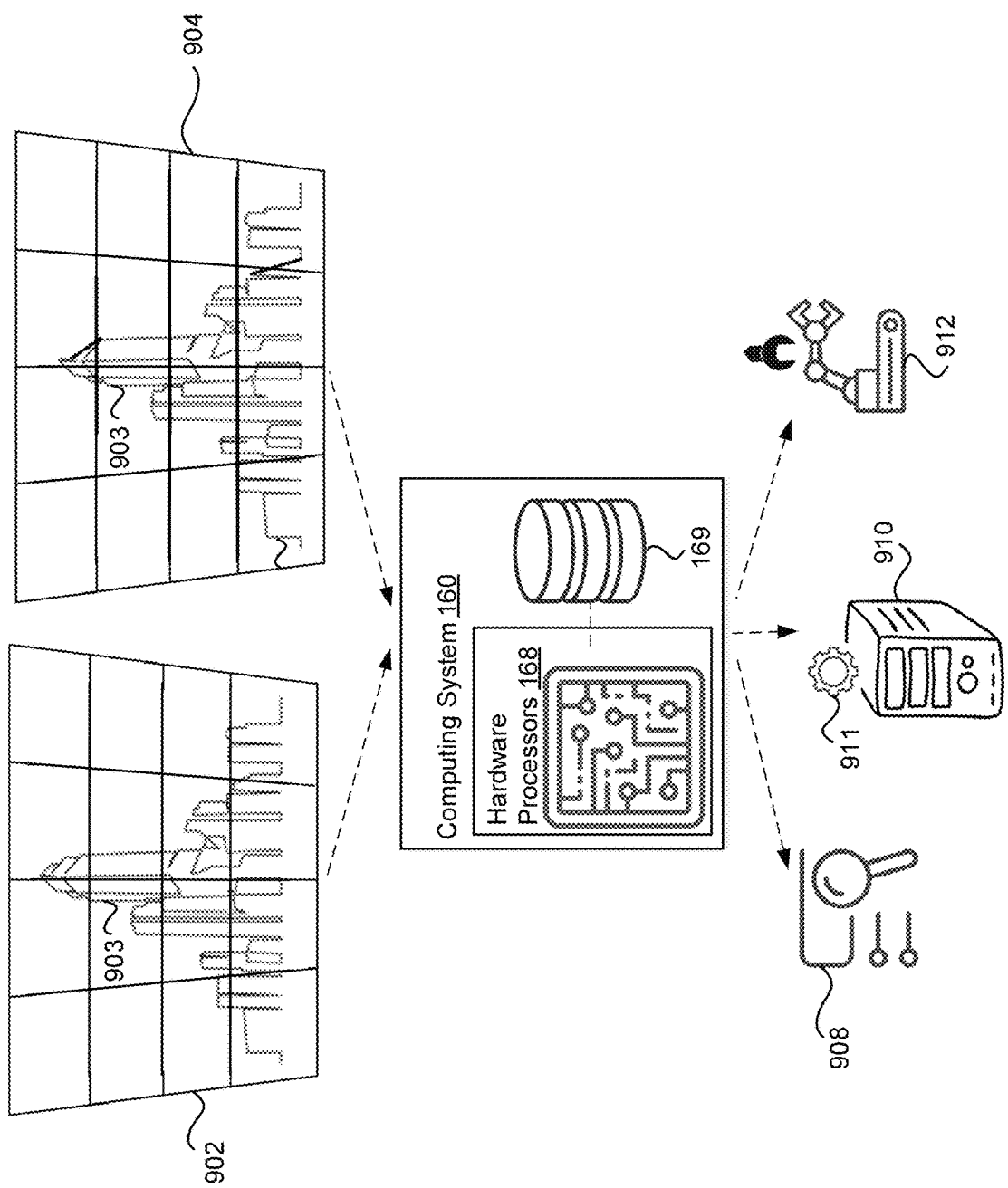

In FIG. 9, the computing system 160 may determine to perform some downstream action in response to a change in an entity 903 over sequential media frames 902 and 904. Although only two sequential frames are illustrated for the sake of brevity, the computing system 160 may make a determination of a downstream action to perform based on more than two media frames. Here, the entity 903 may comprise a static, or primarily static entity, such as a structure. For example, if a parameter or characteristic of the entity 903 changes, at one or more specified geo-coordinates, and/or over a range of geo-coordinates, over time, by more than a threshold amount or rate, then the computing system 160 may perform additional monitoring 908, transmit instructions or protocols to a different computing component 910, for example, via an application programming interface (API) 911 to perform some action, and/or perform some action itself. This action may encompass a maintenance and/or repair operation 912. In FIG. 9, the entity 903 may be tracked to determine whether certain portions of it fall apart or become dilapidated.

Figure 10:
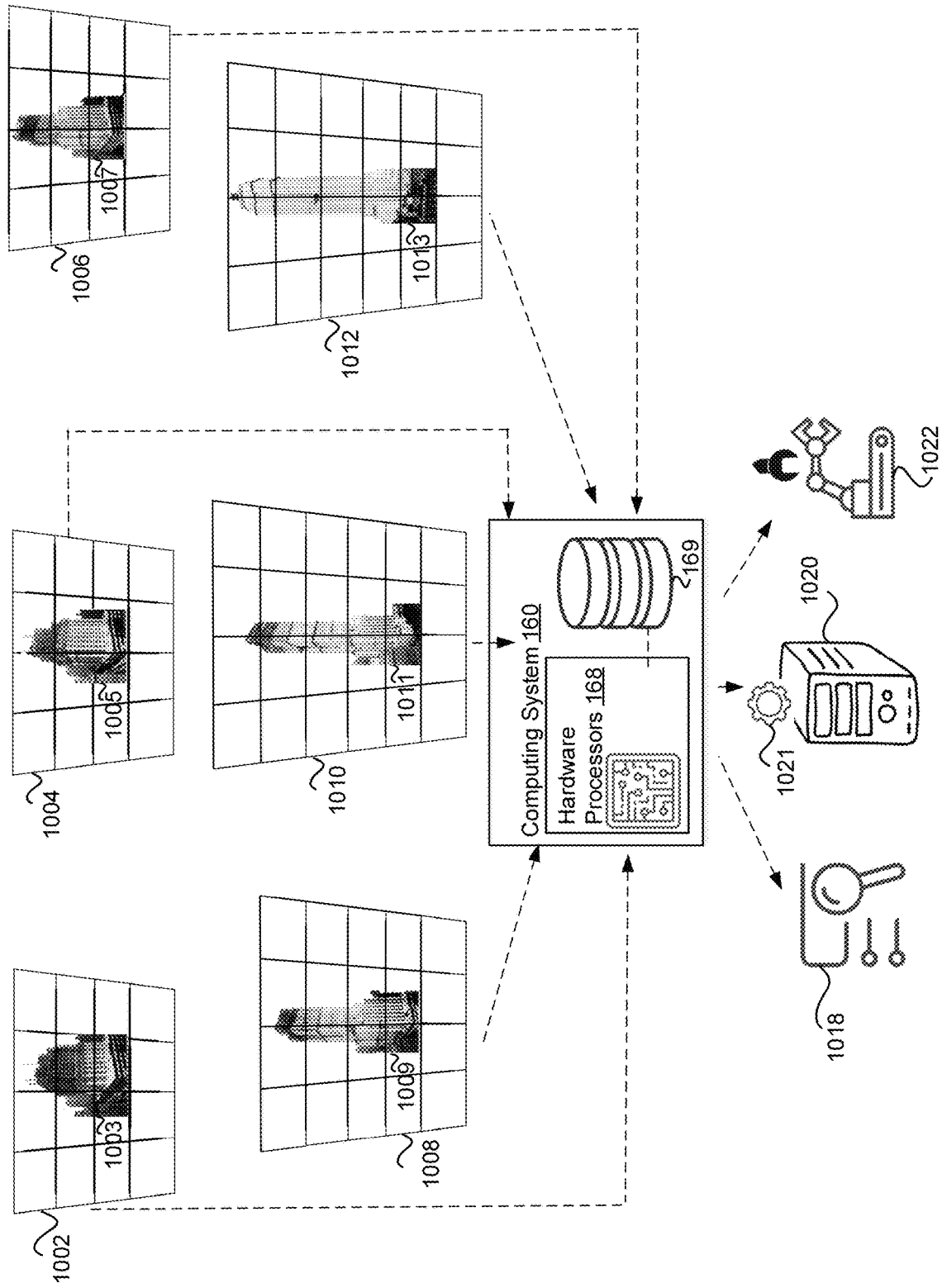

In FIG. 10, the computing system 160 may determine to perform some downstream action in response to a change in an entity over sequential media frames 1002, 1004, 1006, 1008, 1010, and 1012. Corresponding to the sequential media frames 1002, 1004, 1006, 1008, 1010, and 1012, an entity may be at a first stage 1003, a second stage 1005, a third stage 1007, a fourth stage 1009, a fifth stage 1011, and a sixth stage 1013. If, between any two successive stages, the computing system 160 determines that a rate of change falls outside of some threshold range, then the computing system 160 may determine to perform some downstream action. For example, the entity at the different stages may be undergoing construction. The computing system 160 may detect if the construction is progressing too slowly, for example, by detecting one or more changes and/or rates of change at a particular geo coordinates and/or over a range of geo-coordinates over time. Here, the downstream action may constitute additional monitoring 1018, transmit instructions or protocols to a different computing component 920, for example, via an application programming interface (API) 1021 to perform some action, and/or perform some action itself. This action may encompass a maintenance, construction, and/or repair operation 1022.

Figure 11:
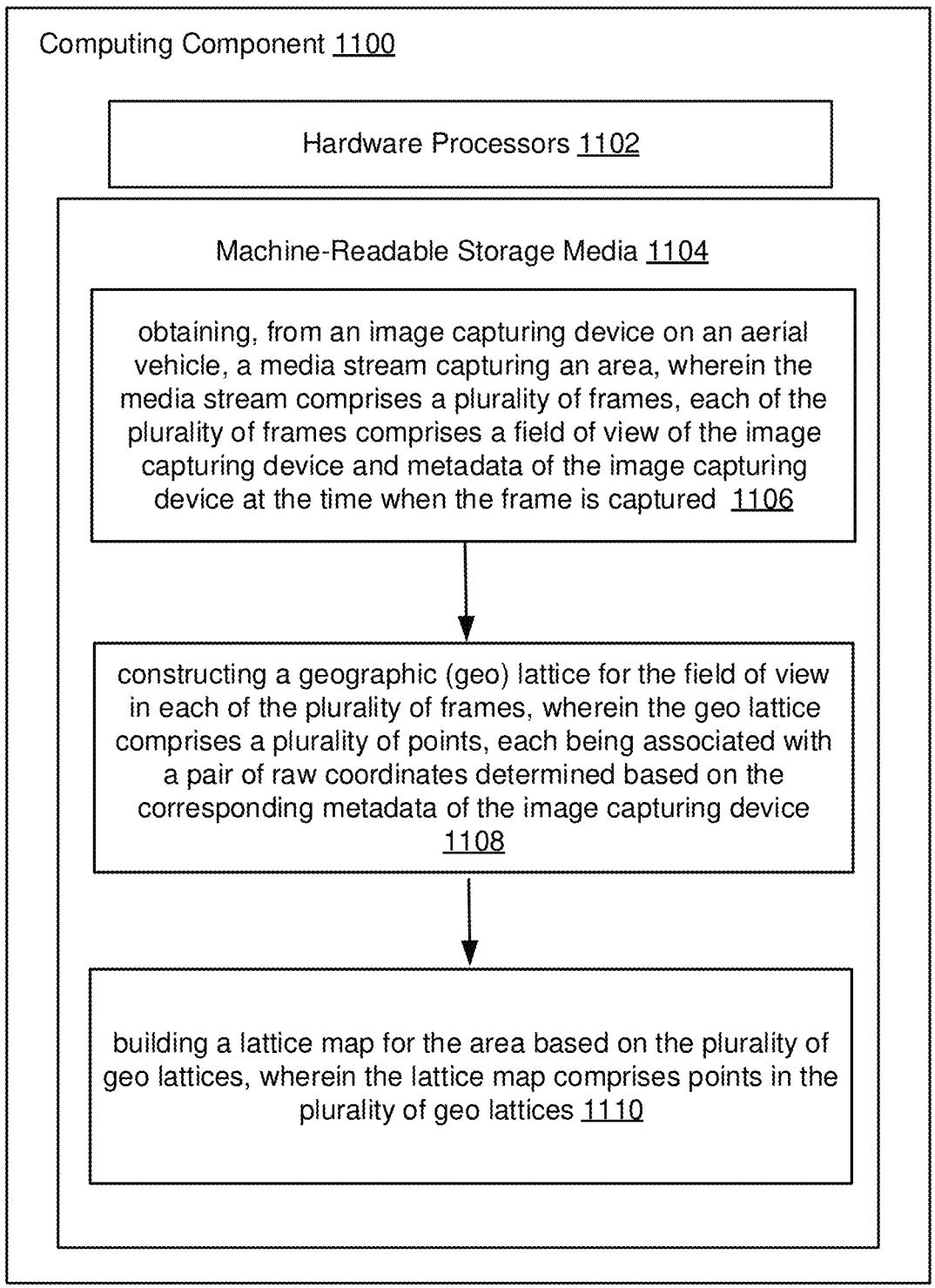
FIG. 11 illustrates a flowchart of an example method of georeferencing stabilization, in accordance with various embodiments of the present technology.

FIG. 11 illustrates a flowchart of an example method of georeferencing stabilization, in accordance with various embodiments of the present technology. A method described in the flowchart may be implemented in various environments including, for example, the environment 100 and/or the environment 101 of FIGS. 1A and 1B, respectively. FIG. 11 illustrates a computing component 1100 that includes one or more hardware processors 1102 and machine-readable storage media 1104 storing a set of machine-readable/machine-executable instructions that, when executed, cause the hardware processor(s) 1102 to perform an illustrative method of georeferencing stabilization. It should be appreciated that there can be additional, fewer, or alternative steps performed in similar or alternative orders, or in parallel, within the scope of the various embodiments discussed herein unless otherwise stated. The computing component 1100 may be implemented on the aerial vehicle 100 and the computing system 160 of FIGS. 1A and 1B. The computing component 1100 may include a server. The machine-readable storage media 1104 may include suitable machine-readable storage media described in FIG. 12.

As shown in FIG. 11, the method may include step 1106 for obtaining, from an image capturing device on an aerial vehicle, a video stream capturing an area, wherein the video stream comprises a plurality of frames, each of the plurality of frames comprises a field of view of the image capturing device and metadata of the image capturing device when the frame is captured.

The method may further include step 1108 for constructing a geographic (geo) lattice for the field of view in each of the plurality of frames, wherein the geo lattice comprises a plurality of points, each being associated with a pair of raw coordinates determined based on the corresponding metadata of the image capturing device.

The method may further include step 1110 for building a lattice map for the area based on the plurality of geo lattices, wherein the lattice map comprises points in the plurality of geo lattices. In some embodiments, the 1110 building of the lattice map may be based on, in response to, and/or dependent from a process of performing image registration. Image registration may be based on the plurality of frames to obtain a plurality of aligned geo lattices; for each point in the lattice map, obtaining multiple pairs of raw coordinates corresponding to the point from the plurality of aligned geo lattices; computing a pair of stabilized geographic coordinates for the point by averaging the multiple pairs of raw coordinates; and building the lattice map for the area by associating the point with the pair of stabilized geographic coordinates. In some embodiments, building the lattice map for the area comprises: building the lattice map based on an estimated projection of the field of view of the image capturing device. In some embodiments, building the lattice map with an estimated projection comprises: orthorectifying the plurality of geo lattices using random sample consensus (RANSAC) to estimate homography matrix for a Nadir projection of the plurality of frames captured by the image capturing device.

Following the orthorectification, further operations on the resulting orthorectified frames may be performed, such as feature extraction, feature analysis, direct measurement, and/or other transformations, as described with respect to FIGS. 7-10.

In some embodiments, the method may further include: receiving a request for geographic coordinates of a ground point in the area; identifying multiple points in the lattice map surrounding the ground point in the request; and computing the geographic coordinates of the ground point by interpolating the multiple pairs of stabilized geographic coordinates associated with the multiple points in the lattice map. In some embodiments, the image registration comprises: computing a homography matrix between a first frame and a second frame of the plurality of frames; and mapping the plurality of points in the geo lattice of the first frame to the plurality of points in the geo lattice of the second frame based on the homography matrix. In some embodiments, the computing of the homography matrix comprises: extracting features from the first frame and the second frame using accelerated-KAZE feature detection and description algorithm; matching the extracted features using K-nearest neighbor search; and constructing the homography matrix by using RANSAC homography estimation based on the matched extracted features.

In some embodiments, the method may further include: receiving an incoming frame from the video stream when the aerial vehicle pans, wherein the incoming frame captures a new location of the area absent from the plurality of frames; constructing a new geo lattice for the incoming frame; extrapolating the lattice map for the area based on the Nadir projection to obtain estimated geo lattices for locations beyond the field of view of the image capturing device; and updating the lattice map by averaging raw coordinates of the new geo lattice with coordinates of the estimated geo lattices.

In some embodiments, the method may further include: determining an error rate of the mapping between the plurality of points in the geo lattice of the first frame to the plurality of points in the geo lattice of the second frame based on the homography matrix; and in response to the error rate being greater than a threshold, skipping one of the first frame or the second frame in building the lattice map.

In some embodiments, the image registration comprises: dividing the plurality of frames into multiple overlapping groups of frames, each group comprising two consecutive frames, and two consecutive groups share one frame; computing multiple homography matrices based on the multiple overlapping groups of frames using parallel processing; and caching the multiple homography matrices for computing a transformation matrix between any two frames of the plurality of frames.

In some embodiments, the image registration is performed on every K frames, where K is an integer greater than one, and the image registration comprises: computing a homography matrix for a first frame of the K frames and a k-th frame of the K frames; and computing intermediate homography matrices for every two frames of the K frames by applying linear interpolation to the homography matrix.

In some embodiments, the lattice map comprises a first channel corresponding to latitude, a second channel corresponding to longitude, and a third channel corresponding to a number of observations of a corresponding point in the plurality of geo lattices.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 12:
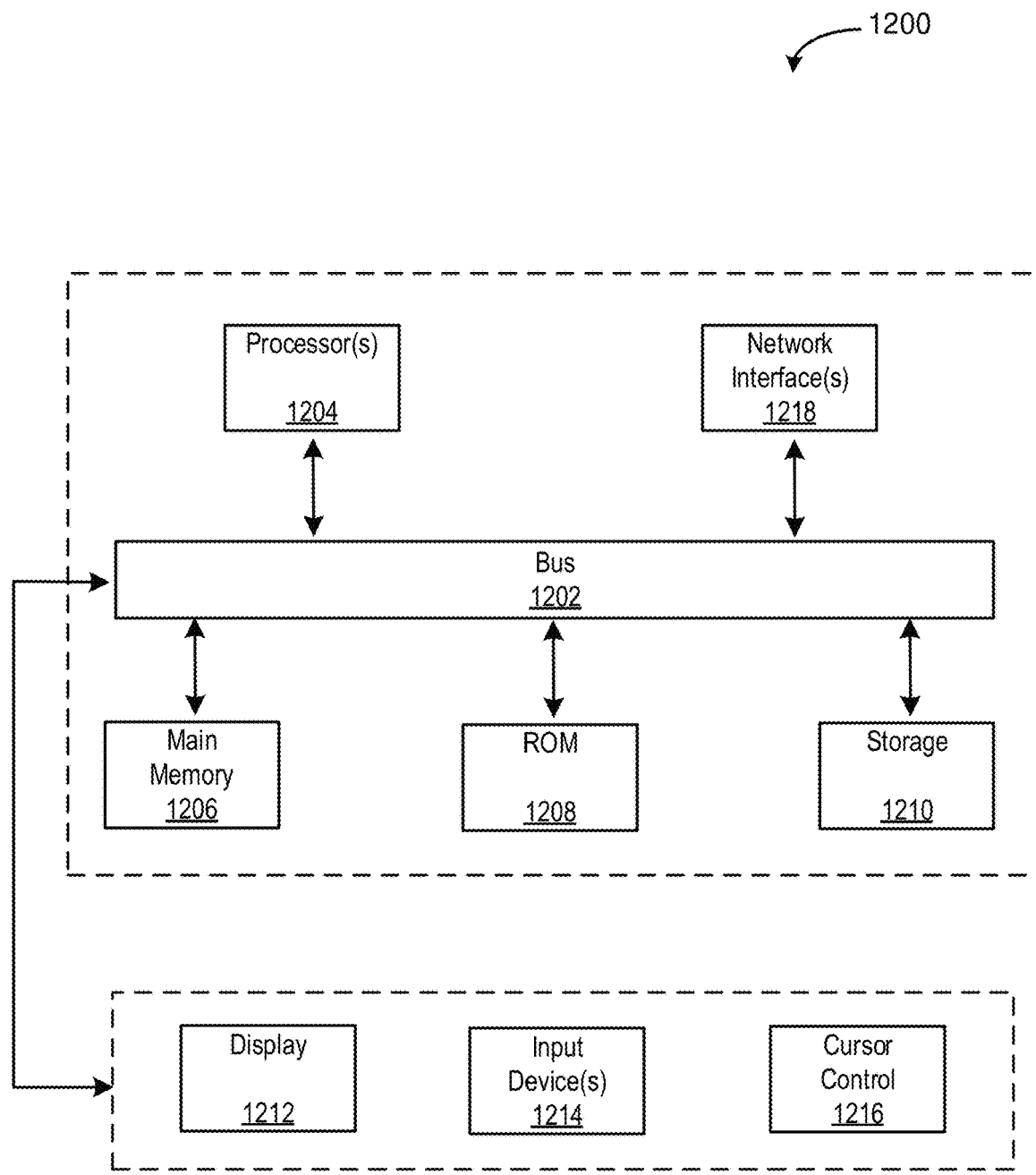
FIG. 12 illustrates a block diagram of an example computer system in which any of the embodiments described herein may be implemented.

FIG. 12 is a block diagram that illustrates a computer system 1200 upon which any of the embodiments described herein may be implemented. The computer system 1200 includes a bus 1202 or other communication mechanism for communicating information, one or more hardware processors 1204 coupled with bus 1202 for processing information. Hardware processor(s) 1204 may be, for example, one or more general purpose microprocessors.

The computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

The computer system 1200 further includes a read only memory (ROM) 121208 or other static storage device coupled to bus 1202 for storing static information and instructions for processor 1204. A storage device 12121010, such as a magnetic disk, optical disk, or USB thumb drive (Flash drive), etc., is provided and coupled to bus 1202 for storing information and instructions.

The computer system 1200 may be coupled via bus 1202 to a display 1212, such as a cathode ray tube (CRT) or LCD display (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 12121010. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 12121010. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may retrieves and executes the instructions. The instructions received by main memory 1206 may optionally be stored on storage device 12121010 either before or after execution by processor 1204.

The computer system 1200 also includes a communication interface 1218 coupled to bus 1202. Communication interface 1218 provides a two-way data communication coupling to one or more network links that are connected to one or more local networks. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicated with a WAN). Wireless links may also be implemented. In any such implementation, communication interface 1218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1218, which carry the digital data to and from computer system 1200, are example forms of transmission media.

The computer system 1200 can send messages and receive data, including program code, through the network(s), network link and communication interface 1218. In the Internet example, a server might transmit a requested code for an application program through the Internet, the ISP, the local network and the communication interface 1218.

The received code may be executed by processor 1204 as it is received, and/or stored in storage device 12121010, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A computer-implemented method for georeferencing stabilization, comprising:
    obtaining, from an image capturing device on a vehicle, a video stream capturing an area, wherein the video stream comprises a plurality of frames, each of the plurality of frames comprises a field of view of the image capturing device and metadata of the image capturing device when the frame is captured;
    constructing a geographic (geo) lattice for the field of view in each of the plurality of frames, wherein the geo lattice comprises a plurality of points, each point being associated with a pair of raw coordinates determined based on the corresponding metadata of the image capturing device;
    building a lattice map for the area based on the plurality of geo lattices, wherein the lattice map comprises points within the plurality of geo lattices, and building the lattice map comprises:
        performing image registration based on the plurality of frames to obtain a plurality of aligned geo lattices;
        for each point in the lattice map, obtaining one or more pairs of raw coordinates corresponding to the point from the plurality of aligned geo lattices;
        computing a pair of stabilized geographic coordinates for the point by averaging any of the one or more pairs of raw coordinates; and
        building the lattice map for the area by associating the point with the pair of stabilized geographic coordinates;
    receiving a request for geographic coordinates of a ground point in the area;
    identifying multiple lattice map points in the lattice map surrounding the ground point in the request; and
    computing the geographic coordinates of the ground point by interpolating the multiple pairs of stabilized geographic coordinates associated with the multiple lattice map points in the lattice map.

2. The method of claim 1, wherein building the lattice map for the area comprises:
    building the lattice map based on an estimated projection of the field of view of the image capturing device.

3. The method of claim 2, wherein building the lattice map with an estimated projection comprises:
    orthorectifying the plurality of geo lattices using random sample consensus (RANSAC) to estimate homography matrix for a Nadir projection of the plurality of frames captured by the image capturing device.

4. The method of claim 2, further comprising:
    receiving an incoming frame from the video stream when the vehicle pans, wherein the incoming frame captures a new location of the area absent from the plurality of frames;
    constructing a new geo lattice for the incoming frame;
    extrapolating the lattice map for the area based on the Nadir projection to obtain estimated geo lattices for locations beyond the field of view of the image capturing device; and
    updating the lattice map by averaging raw coordinates of the new geo lattice with coordinates of the estimated geo lattices.

5. The method of claim 1, wherein the geo lattice is constructed by using ray tracing.

6. The method of claim 1, wherein the image registration comprises:
    computing a homography matrix between a first frame and a second frame of the plurality of frames; and mapping the plurality of points in the geo lattice of the first frame to the plurality of points in the geo lattice of the second frame based on the homography matrix.

7. The method of claim 6, further comprising:
   determining an error rate of the mapping between the plurality of points in the geo lattice of the first frame to the plurality of points in the geo lattice of the second frame based on the homography matrix; and
   in response to the error rate being greater than a threshold, skipping one of the first frame or the second frame in building the lattice map.

8. The method of claim 6, wherein the computing of the homography matrix comprises:
   extracting features from the first frame and the second frame using accelerated-KAZE feature detection and description algorithm;
   matching the extracted features using K-nearest neighbor search; and
   constructing the homography matrix by using RANSAC homography estimation based on the matched extracted features.

9. The method of claim 1, wherein the image registration comprises:
   dividing the plurality of frames into multiple overlapping groups of frames, each group comprising two consecutive frames, and two consecutive groups share one frame;
   computing multiple homography matrices based on the multiple overlapping groups of frames using parallel processing; and
   caching the multiple homography matrices for computing a transformation matrix between any two frames of the plurality of frames.

10. The method of claim 1, wherein the image registration is performed on every K frames, where K is an integer greater than one, and the image registration comprises:
    computing a homography matrix for a first frame of the K frames and a k-th frame of the K frames; and
    computing intermediate homography matrices for every two frames of the K frames by applying linear interpolation to the homography matrix.

11. The method of claim 1, wherein the lattice map comprises a first channel corresponding to latitude, a second channel corresponding to longitude, and a third channel corresponding to a number of observations of a corresponding point in the plurality of geo lattices.

12. The method of claim 1, wherein the vehicle comprises a drone or a Synthetic-aperture radar (SAR).

13. A computing system for georeferencing stabilization, comprising:
    one or more processors; and
    memory storing instructions that, when executed by the one or more processors, cause the system to perform operations comprising:
    obtaining, from an image capturing device on a vehicle, a video stream capturing an area, wherein the video stream comprises a plurality of frames, each of the plurality of frames comprises a field of view of the image capturing device and metadata of the image capturing device when the frame is captured;
    constructing a geographic (geo) lattice for the field of view in each of the plurality of frames, wherein the geo lattice comprises a plurality of points, each being associated with a pair of raw coordinates determined based on the corresponding metadata of the image capturing device;
    building a lattice map for the area based on the plurality of geo lattices, wherein the lattice map comprises within the plurality of geo lattices, and building the lattice map comprises:
    performing image registration based on the plurality of frames to obtain a plurality of aligned geo lattices;
    for each point in the lattice map, obtaining one or more pairs of raw coordinates corresponding to the point from the plurality of aligned geo lattices;
    computing a pair of stabilized geographic coordinates for the point by averaging any of the one or more pairs of raw coordinates; and
    building the lattice map for the area by associating the point with the pair of stabilized geographic coordinates;
    receiving a request for geographic coordinates of a ground point in the area;
    identifying multiple lattice map points in the lattice map surrounding the ground point in the request; and
    computing the geographic coordinates of the ground point by interpolating the multiple pairs of stabilized geographic coordinates associated with the multiple lattice map points in the lattice map.

14. The computing system of claim 13, wherein building the lattice map for the area comprises:
    building the lattice map based on an estimated projection of the field of view of the image capturing device.

15. The computing system of claim 13, wherein the image registration comprises:
    computing a homography matrix between a first frame and a second frame of the plurality of frames; and
    mapping the plurality of points in the geo lattice of the first frame to the plurality of points in the geo lattice of the second frame based on the homography matrix.

16. The computing system of claim 15, wherein the computing of the homography matrix comprises:
    extracting features from the first frame and the second frame using accelerated-KAZE feature detection and description algorithm;
    matching the extracted features using K-nearest neighbor search; and
    constructing the homography matrix by using RANSAC homography estimation based on the matched extracted features.

17. The computing system of claim 13, wherein the image registration comprises:
    dividing the plurality of frames into multiple overlapping groups of frames, each group comprising two consecutive frames, and two consecutive groups share one frame;
    computing multiple homography matrices based on the multiple overlapping groups of frames using parallel processing; and
    caching the multiple homography matrices for computing a transformation matrix between any two frames of the plurality of frames.

18. A non-transitory computer-readable storage medium configured with instructions executable by one or more processors to cause the one or more processors to perform operations comprising:
    obtaining, from an image capturing device on a vehicle, a video stream capturing an area, wherein the video stream comprises a plurality of frames, each of the plurality of frames comprises a field of view of the image capturing device and metadata of the image capturing device when the frame is captured;

constructing a geographic (geo) lattice for the field of view in each of the plurality of frames, wherein the geo lattice comprises a plurality of points, each being associated with a pair of raw coordinates determined based on the corresponding metadata of the image capturing device;

computing a transformation matrix between a first frame and a second frame of the plurality of frames;

building a lattice map for the area based on the plurality of geo lattices, wherein the lattice map comprises points within the plurality of geo lattices, and building the lattice map comprises:

performing image registration based on the plurality of frames to obtain a plurality of aligned geo lattices;

for each point in the lattice map, obtaining one or more pairs of raw coordinates corresponding to the point from the plurality of aligned geo lattices;

computing a pair of stabilized geographic coordinates for the point by averaging any of the one or more pairs of raw coordinates;

mapping one or more points in the geo lattice of the first frame to one or more points in the geo lattice of the second frame based on the transformation matrix;

determining an error rate of the mapping between one or more points in the geo lattice of the first frame and one or more corresponding points in the geo lattice of the second frame;

in response to the error rate being greater than a threshold, skipping one of the first frame or the second frame in the building of the lattice map; and building the lattice map for the area by associating the point with the pair of stabilized geographic coordinates.

* * * * *